United States Patent [19]

Iverson et al.

[11] 4,233,643
[45] Nov. 11, 1980

[54] ELECTRICAL POWER SWITCHING APPARATUS WITH SLIDING FUSE DRAWER AND INTERLOCK SYSTEM

[75] Inventors: James R. Iverson, Fridley; Derrick N. Alcock, Bloomington, both of Minn.

[73] Assignee: Electric Machinery Mfg. Company, Minneapolis, Minn.

[21] Appl. No.: 963,162

[22] Filed: Nov. 22, 1978

[51] Int. Cl.³ .............................................. H02B 1/04
[52] U.S. Cl. .................................. 361/344; 361/334; 361/339; 361/345
[58] Field of Search ........................................ 337/4-9; 200/50 R, 50 AA, 51 R; 361/334, 335, 338, 339, 341, 342, 343, 344, 345, 430, 431, 432

[56] References Cited

U.S. PATENT DOCUMENTS

| | | | |
|---|---|---|---|
| 3,573,559 | 4/1971 | Rogers | 200/50 AA |
| 3,603,753 | 9/1971 | Frink | 200/50 AA |
| 3,676,749 | 7/1972 | Wilson | 361/343 |
| 3,790,861 | 2/1974 | Sakats | 361/343 |
| 4,002,864 | 1/1977 | Kuhn | 200/50 AA |
| 4,090,230 | 5/1978 | Fuller | 361/345 |

*Primary Examiner*—Gerald P. Tolin

*Attorney, Agent, or Firm*—Merchant, Gould, Smith, Edell, Welter & Schmidt

[57] ABSTRACT

A switching apparatus (10) for use in an electrical control device is disclosed. The apparatus (10) includes a housing (12) divided into a switching section (28) and a bus section (26). The bus section (26) has a plurality of bus members (82) for supplying incoming electrical current. A fuse chassis (96) is attached to the housing (12) for reciprocal movement into and out of the switching section (28). A plurality of fuse units (116) are held in the fuse chassis (96). A contactor mechanism (124) is supported in the switching section (28) for connecting and disconnecting the flow of current from the bus members (82) to an electrically actuated device. A first connector mechanism (162-166) connects first ends of the fuse units (116) to the bus members (82), and a second connector mechanism connects second ends of the fuse units (116) to the contactor mechanism (124). A door (34) is attached to a front face (14) of the housing (12) for pivotable motion between an opened and a closed position. A moving mechanism (220) is provided for moving the fuse chassis (96) between an engaged position and an isolated position.

55 Claims, 19 Drawing Figures

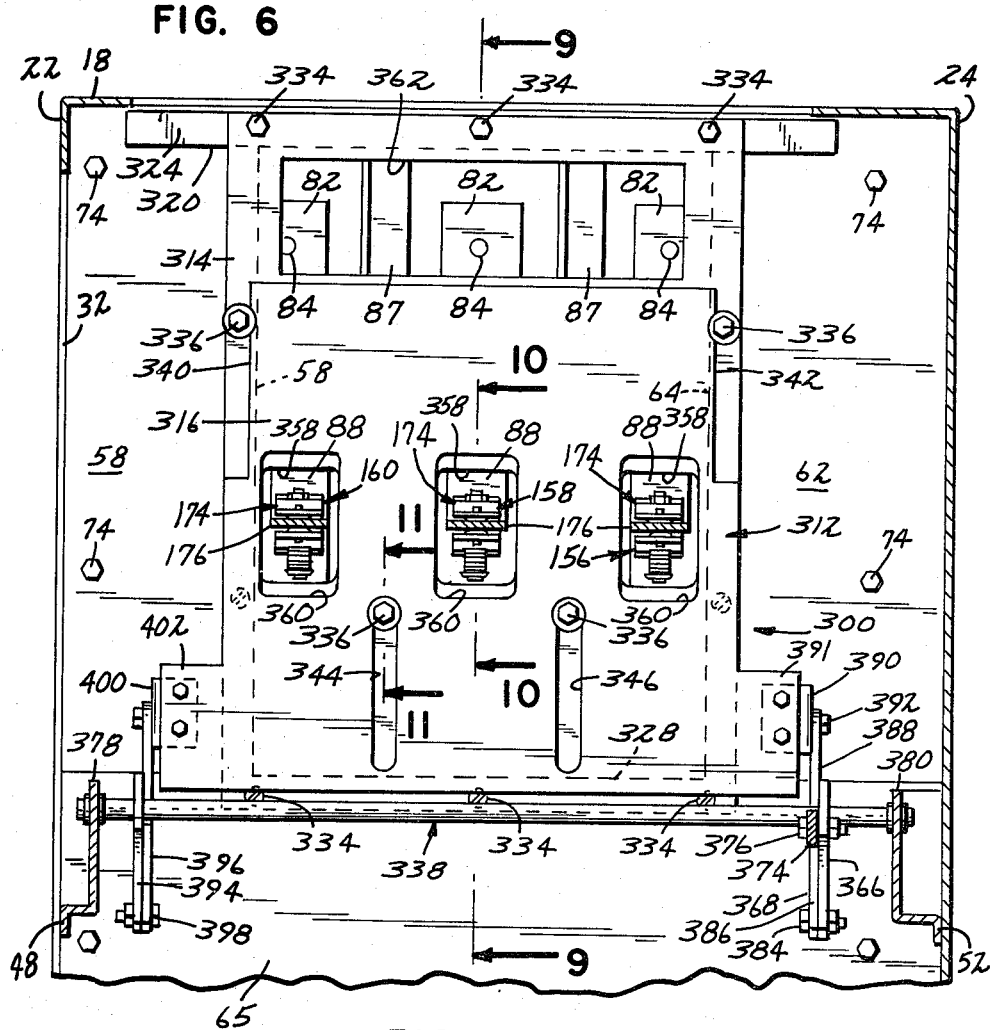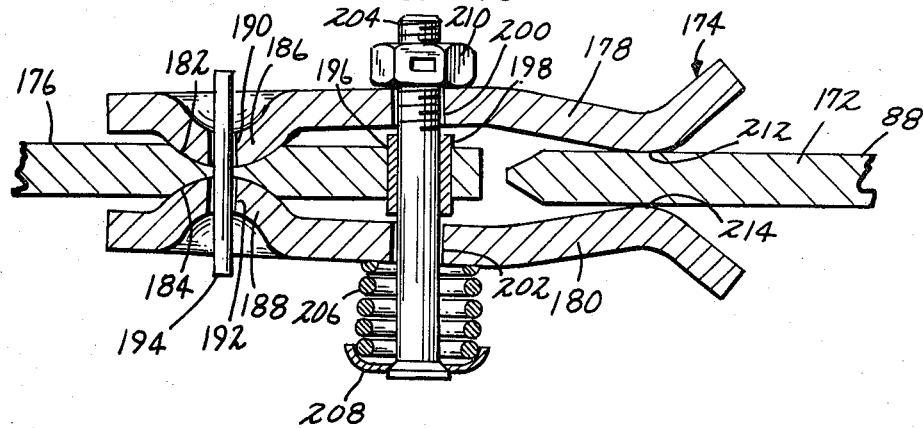

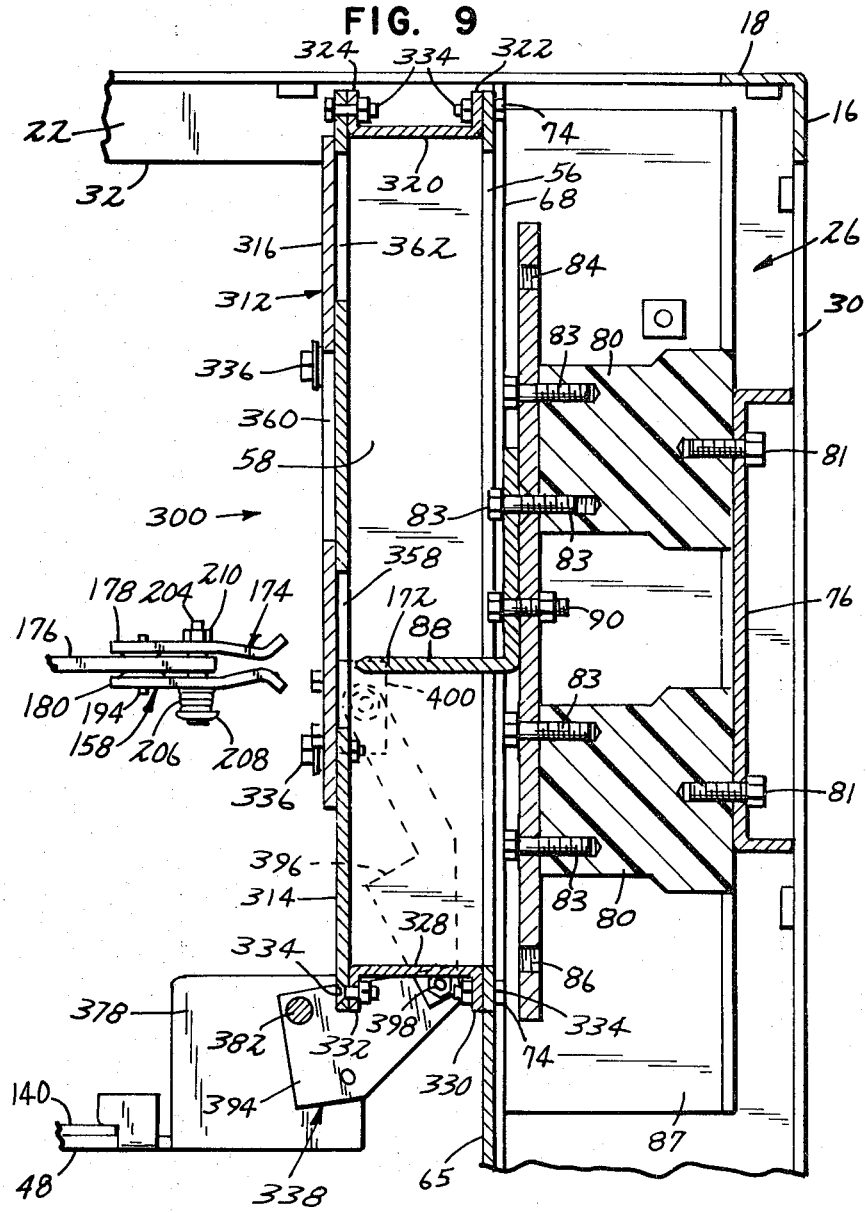

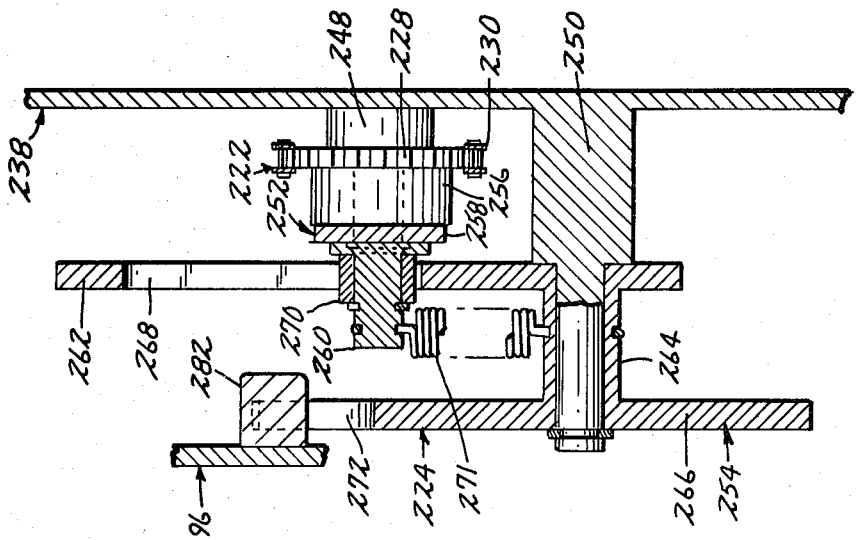
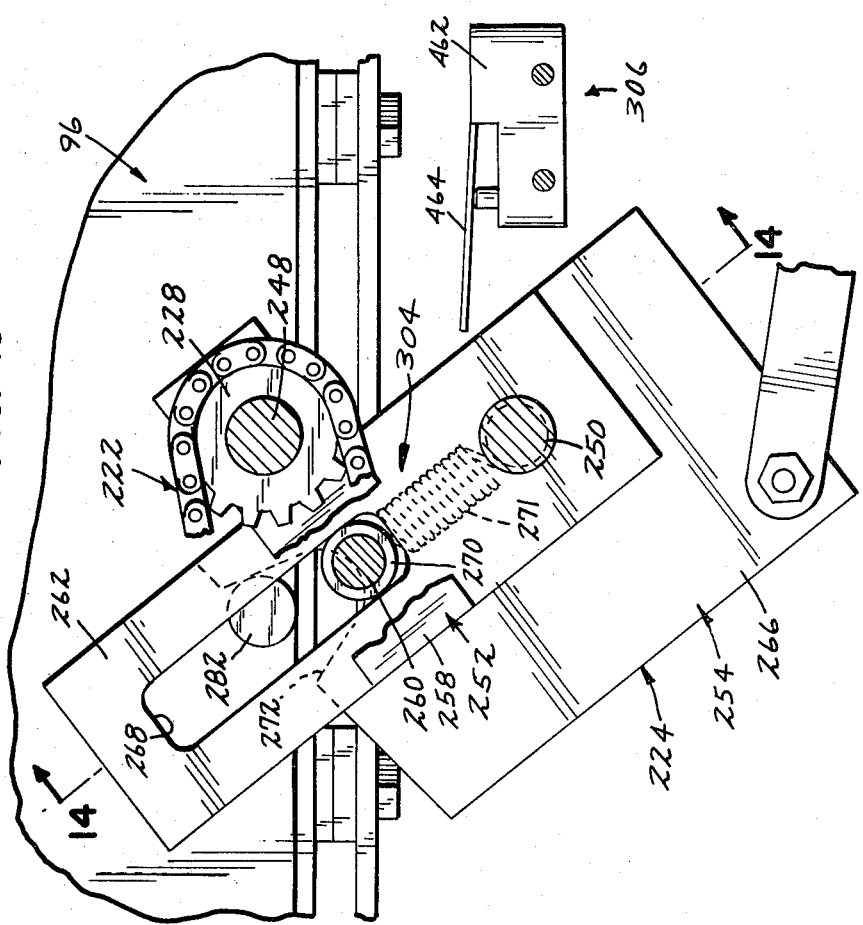

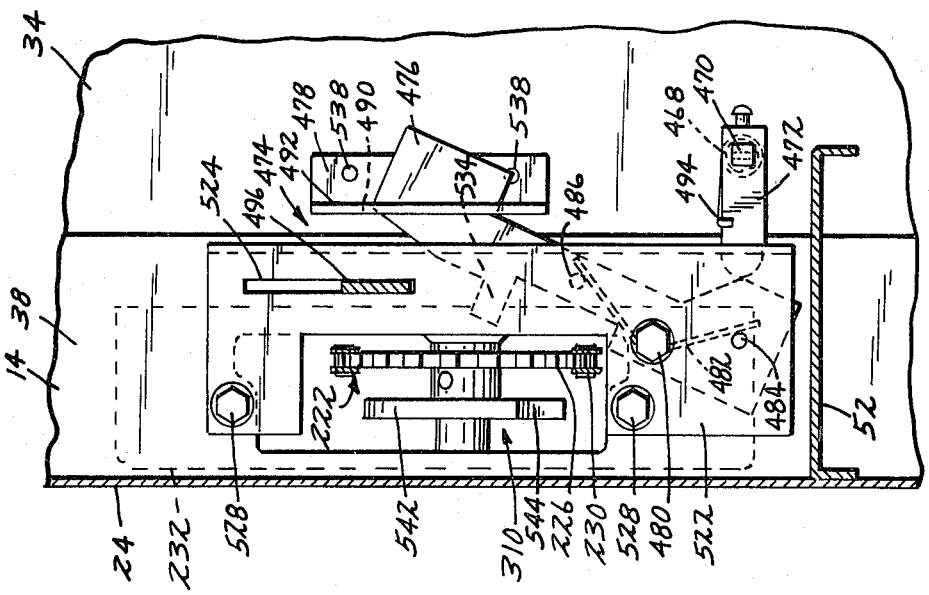
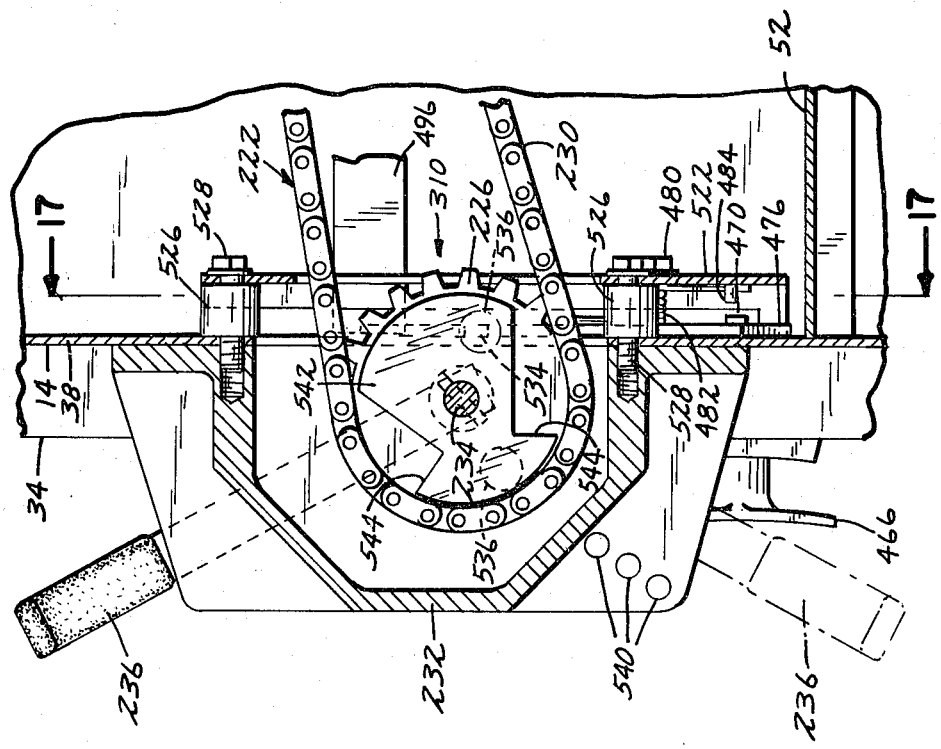

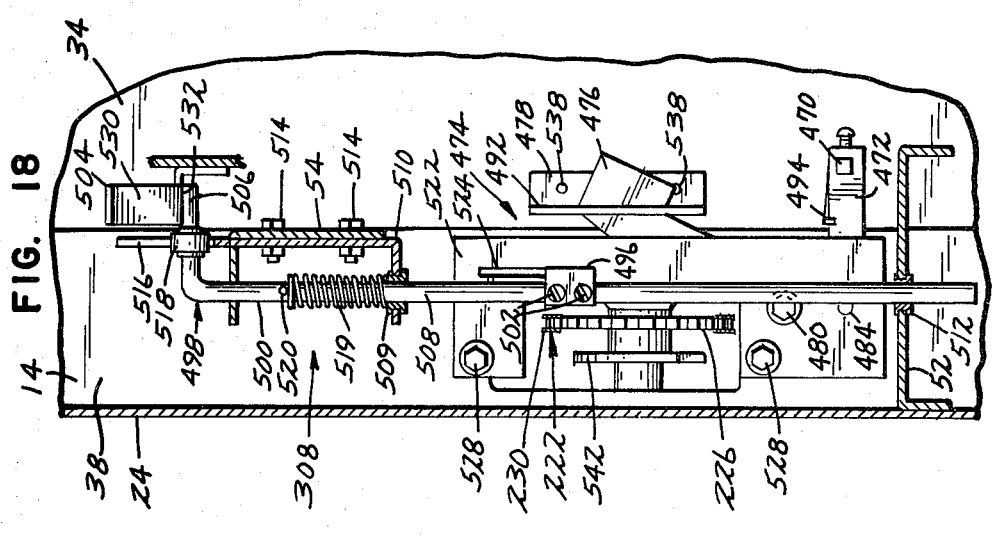
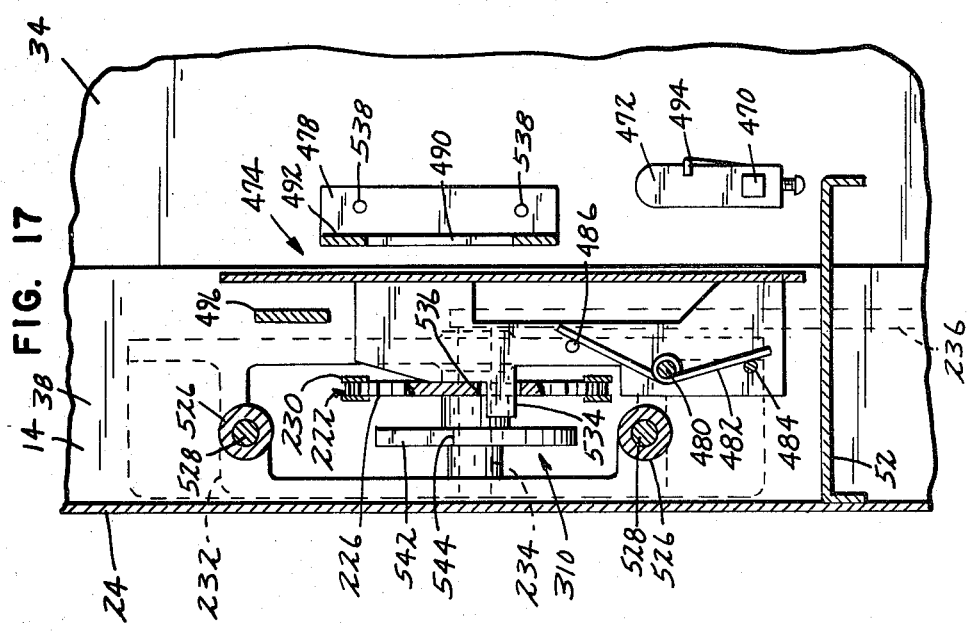

ELECTRICAL POWER SWITCHING APPARATUS WITH SLIDING FUSE DRAWER AND INTERLOCK SYSTEM

TECHNICAL FIELD

The present invention relates to electrical power switching apparatus. The power switching apparatus of the present invention is utilized in motor control operations for motors starting duty in the medium voltage (2300–7200 volts) class. More particularly, the present invention relates to an apparatus of a power module which incorporates the switching, fusing and isolating functions for the motor starter within a single compact housing.

BACKGROUND OF THE PRIOR ART

Numerous types of electrical power switching apparatus are known in the prior art. Different types of switching mechanisms are generally used within different voltage ranges. Within lower voltage ranges simple mechanical switches may prove suitable. In the higher voltage ranges, more complex and generally bulky switching mechanisms are required. Safety, reliability and space efficiency are important design criteria for the switching mechanisms utilized in the higher voltage ranges.

Within the medium voltage class, i.e. 2300–7200 volts, the typical switching mechanisms have generally been large. One reason for the large size of these prior art devices, has been the need to space the fuses a sufficient distance from the switching mechanism in order to protect the fuses from the arcing which usually occurs at the switching mechanism. Also, this type of prior art device has proven cumbersome to operate or repair because the fuses and the switches have been fixed together so that a large and sturdy roller system is required to move the fuses and the switches in unison.

In higher voltage ranges, for example 15,000 volts incoming voltage, other types of switching mechanisms, which are generally referred to as switchgear mechanisms are utilized. U.S. Pat. No. 2,885,501 to J. D. Wood et al; U.S. Pat. No. 2,914,635 to W. N. Lester et al; and U.S. Pat. No. 3,610,850 illustrate several switchgear mechanisms. In the above patents, rather large movable units carry fuses and other components into and out of a surrounding housing.

U.S. Pat. Nos. 3,530,418 and 3,579,045 to T. H. Keogh et al illustrate another type of high voltage switching mechanisms. In the Keogh et al patents, a switching mechanism is interposed between incoming high voltage lines and a step down transformer. The switching mechanism includes a circuit breaker connected to the incoming high voltage lines and a plurality of fuses interposed between the circuit breaker and a transformer which is disposed outside the switching mechanism. The fuses are mounted on a chassis mechanism which is slidable into and out of the housing of the switching mechanism.

SUMMARY OF THE INVENTION

The present invention is directed to a switching apparatus for use in a motor control device. The switching apparatus includes a housing which has a switching section and a bus section. The bus section has a plurality of bus members for supplying incoming electrical current. A fuse chassis is attached to the housing for reciprocal movement into and out of the switching section of the housing. A plurality of fuses are held in the fuse chassis. A contactor mechanism is supported in the switching section for connecting and disconnecting the flow of current of the bus members to an electrically actuated device. A first connector means connects the first ends of the fuses to the bus members and a second connector means connects a second end of the fuses to the contactor mechanism. A door is attached to a front face of the housing for pivotal motion between an open and a closed position. A means is provided for moving the fuse chassis between an engaged position and an isolated position. In an engaged position, the first and second connector means connect the fuses between the bus members and the contactor mechanism. In the isolated position, the fuses are disconnected from both the bus members and the contactor mechanism. The fuse chassis moving means is actuated from outside the housing.

In the preferred embodiment, the contactor mechanism is a vacuum contactor made up of a plurality of vacuum switches. The vacuum contactor has the advantage of being compact in size and in containing arcing. Since the contacts are in a vacuum, no arc welds or ionized gases are produced. As was mentioned above, the fuse chassis is movable between an engaged and isolated position independently of the contactor assembly. The contactor assembly is fixed in place during its normal operation and is not part of the isolation process. Thus, the contactor assembly is not subject to shock and vibration from rocking in and out of the housing.

The preferred embodiment also includes a plurality of interlocking means or mechanisms. A first interlock means includes a barrier means for blocking access to the bus members from the switching section when the fuse chassis is in the isolated position. The barrier means includes a stationary plate and a movable barrier plate. When the fuse chassis is in the engaged position, apertures in the stationary plate and the barrier plate are aligned. When the fuse chassis is in the isolated position, the movable barrier plate is moved to a position wherein the apertures are out of alignment and a solid walled barrier is interposed between the switching section and the bus members. A barrier plate moving means is connected to the fuse chassis moving means through a first linkage means.

A second interlock means is provided for preventing the withdrawal of the fuse chassis from its engaged position and for preventing the movement of the fuse chassis from its isolated position to its engaged position when the contactor mechanism is in its activated position. The second interlock means includes a second linkage means which is coupled to a movable portion of the contactor mechanism and to a movable blocking means. The second linkage means transfers the motion of the movable portion of the contactor mechanism to motion of the blocking means. The blocking means in turn obstructs the motion of the fuse chassis when the contactor mechanism is activated.

A third interlock means is directly related to the fuse chassis moving means. The fuse chassis moving means includes a chain driven mechanism and a means for connecting the chain driven mechanism to the fuse chassis. The third interlock means prevents the withdrawal of the fuse chassis from its engaged position except through the activation of the chain drive mechanism and also prevents the insertion of the fuse chassis to its engaged position from its isolated position except through the activation of the chain driven mechanism.

A fourth interlock means is also related to the fuse chassis moving means. The fourth interlocking means is an electrical interlock which prevents the activation of the contactor mechanism unless the fuse chassis is in its engaged position. An override mechanism is provided for allowing the contactor mechanism to be activated for test purposes.

A fifth interlock means is provided for preventing the opening of the door when the fuse chassis is in its engaged position. The fifth interlock means is related to a door latching mechanism. The door latching mechanism includes a rotatable handle disposed on the outside of the door and an actuator bar connected to the handle and disposed on the inside of the door. A pivotable latch plate is pivotably secured to the housing adjacent the door. The latch plate engages a slot within a flange that is attached to the inside of the door when the actuator bar is rotated to contact the latch plate. The fifth interlock means includes a blocking bar which holds the latch plate within the slot of the flange when the fuse chassis is in its engaged position, even though the actuator bar is rotated out of contact with the latch plate.

A sixth interlock means is provided for preventing the movement of the fuse chassis from its isolated position to its engaged position when the door is open. The sixth interlock means includes a locking projection extending from the latch plate. The locking projection engages a portion of the fuse chassis moving means, more specifically a portion of the chain drive mechanism, when the door is in its open position. The moving means is thus prevented from moving the fuse chassis to its engaged position.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

DETAILED DESCRIPTION OF THE DRAWINGS

FIG. 6 is a sectional view taken generally along line 6—6 of FIG. 4, illustrating the barrier means;

FIG. 9 is an enlarged sectional view taken generally along line 9—9 of FIG. 6;

FIG. 10 is an enlarged sectional view taken generally along line 10—10 of FIG. 6;

FIG. 11 is an enlarged sectional view taken generally along line 11—11 of FIG. 6;

FIG. 13 is a sectional view similar to FIG. 12 illustrating the chain drive means and connecting means in another position;

FIG. 14 is a sectional view taken generally along line 14—14 of FIG. 13;

FIG. 15 is an enlarged sectional view taken generally along line 15—15 of FIG. 4, illustrating a portion of the chain driven means;

FIG. 16 is an enlarged sectional view taken generally along line 16—16 of FIG. 4, illustrating the door latching mechanism;

FIG. 17 is a sectional view taken generally along line 17—17 of FIG. 15;

FIG. 18 is an enlarged sectional view taken generally along line 18—18 of FIG. 4, illustrating the fifth interlock means.

DETAILED DESCRIPTION OF THE INVENTION

Figure 1:
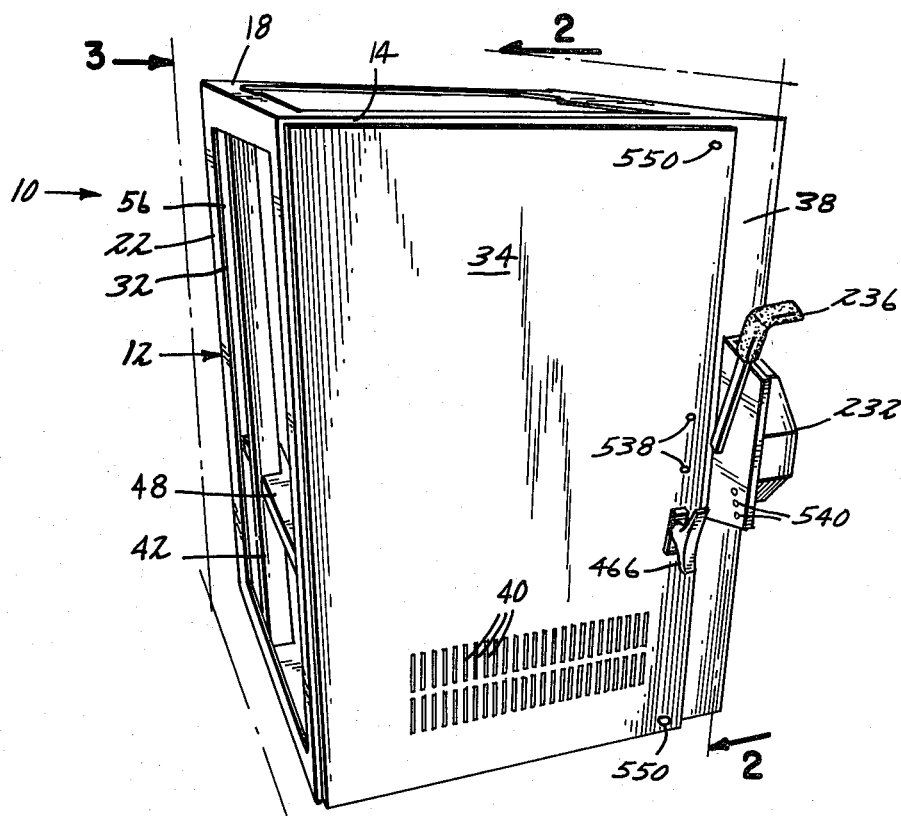
FIG. 1 is a front elevational view of a switching apparatus in accordance with the present invention.

Referring to the drawings in detail, wherein like numerals indicate like elements, there is shown in FIG. 1 an electrical power switching apparatus, designated generally as 10. The apparatus 10 includes a frame or housing 12 having a front face 14, a back face 16, a top face 18, a bottom face 20, and a pair of opposed side faces 22, 24. The housing is divided into a bus section 26 and a switching section 28. The bus section 26 is located at the rear of the housing 12, while the switching section 28 is located in front of the bus section 26.

The back face 16 has an opening 30 which permits incoming high voltage lines to be connected to the bus section 26. The incoming voltage lines are generally in the medium voltage class, i.e. 2300–7200 volts. The side face 22 also has an opening 32. The opening 32 permits additional components (not shown) to be attached to the side face 22 so that the apparatus 10 can be incorporated into a modular designed system. A door 34 is mounted to the front face 14 for a pivotable motion about a hinge mechanism 36. The door 34 is pivotable between an open position wherein access is gained to the interior of the switching section 28 and a closed position wherein access is blocked. A solid mounting section 38 extends along the front face 14 at one side of the door 34. A plurality of air inlet slots 40 are formed in the door 34 adjacent its lower end. A barrier 41 is attached to the interior of the door 34 above the slots 40.

A plurality of support members, hereinafter more fully described, are secured within the housing 12 to support the various components of the apparatus 10. An upright support member 42 extends vertically along the opening 32 in the side face 22. A first lower horizontal support member 44 is attached at one end to a portion 46 of the front face 14 and at its other end to an inwardly extending portion of the upright support member 42 see FIG. 4. A first lower horizontal support member 48 extends horizontally along the side face 22 and is attached to the housing 12 and the upright support member 42.

A second upright support member 50 is secured to an inner wall of the side face 24 and extends generally therealong. A second lower horizontal support member 52 is attached to the inner wall of the side face 24 and extends generally horizontally therealong. A second upper horizontal support member 54 extends horizontally within the switching section 28 adjacent to the side face 24. A first end of the horizontal support member 54 is secured to an inside wall of the mounting section 38 and the other end of the support member 54 is secured to the upright member 50.

A plurality of divider members 56, 58, 60, 62, 64, and 65 together with a portion of a first interlock means 300 divide the interior of the housing 12 into the bus section 26 and the switching section 28. A flange or ear 68 extends radially inward from the side face 22. The divider member 56 is in the form of a flat plate and has a first side attached to the flange 68. The divider member 58 is in the form of a generally U-shaped channel member having a pair of legs extending from a base portion. One of the legs of the channel member 58 is attached to the divider member 56 while the other leg is attached to a portion of the first interlock means 300. On the other side of the housing, an angled member functions as the divider member 60 and also has an upright support. The member 60 has a first leg 70 attached to the inner surface of the side face 24. A second leg 72 of the divider member 60 extends generally perpendicularly inward from the side face 24. The divider member 62 in the form of a flat plate has a first side secured to the leg 72. The divider member 64 is in the form of a U-shaped channel having a first leg connected to the other side of the divider member 62 and a second leg attached to a portion of the first interlock means. The divider members 56-64 are preferably attached to one another and to the first interlock means by conventional nut and bolt units 74. The divider members 56, 58, 62, 64 and 65 are formed of an insulative material.

A cross brace 76 extends horizontally along the back face 16. A plurality of like insulating blocks 80 are attached to the cross braces 76, 78. As best seen in FIG. 9, the insulating blocks 80 are preferably attached to cross brace 76 by means of screws or bolts 81. Three pairs of insulating blocks 80 are secured to the cross brace 76. A single integral bus member 82 extends generally vertically and is attached to each pair of insulating blocks 80 by means of screws or bolts 83. An upper hole 84 is formed through each bus member 82 adjacent its upper end and a lower hole 86 is formed adjacent the lower end thereof. The holes 84, 86 are provided as coupling means for connecting each bus member to an incoming line voltage cable or alternatively to another bus member. A generally L-shaped stab member 88 is attached to each of the bus members 82 by means of one of the screws 83 which extends into one of the blocks 80 and by means of a nut and bolt unit 90. A pair of insulating barriers 87 are disposed between adjacent pairs of insulating blocks 80.

A telescoping support mechanism 92 is bolted to the horizontal support member 44 and a similar telescoping support mechanism 94 is bolted to the horizontal support member 54. The telescoping support mechanisms 92, 94 are of conventional design and, hence, are only shown diagrammatically. The support mechanisms 92, 94 are similar to office drawer support or racking mechanisms, except that they are designed for heavier duty. A fuse chassis 96 is attached to the telescoping support mechanisms 92, 94. By means of the telescoping support mechanisms 92, 94, the fuse chassis 96 is reciprocally movable into and out of the switching section 28 in a manner more fully explained hereinafter. The fuse chassis 96 has a pair of side walls 98, 100 and a pair of divider walls 102, 104. The fuse chassis 96 is thus divided into three compartments 106, 108, 110. A front clip 112 and a back clip 114 is attached within each of the compartments 106-110. The clips 112, 114 support a separate fuse means or units 116 within each of the compartments 106-110. Each fuse unit 116 includes a pair of fuses 118, 120 supported one above the other. A connector 122 is used to physically and electrically connect a fuse 118 with its associated fuse 120. Alternatively, each fuse unit 116 may contain only a single fuse 118. The fuse units 116 serve as current limiting protection for the switching apparatus 10 and associated controlled equipment.

A contactor mechanism 124 is provided for performing the on-off switching function between the incoming line voltage and an electrically actuated device driven thereby. The electrically actuated device is not shown, but generally would be an electric motor driven by voltages in the medium class. The contactor mechanism 124 includes a plurality of vacuum switching means 126, 128 and 130. Each of the vacuum switching means 126-130 is connected to one of the bus members 82 through one of the fuse units 116 in a manner more fully explained hereinafter. The vacuum switching means 126-130 are conventional and hence will be described only briefly. The vacuum switching means 126-130 are supported within a stationary portion 132 of the contactor mechanism 124. The stationary portion 132 has a pair of opposed walls 134, 136. The side wall 134 is secured to an angled flange 140 which in turn is attached to the lower horizontal support member 48 by a nut and bolt means 142. The side wall 136 is attached to an angled flange 144 which in turn is attached to the second lower horizontal support member 52 by nut and bolt means 146. In this manner, the contactor mechanism 124 is supported within the switching section 28. A cross bar 148 which serves as a handle, is secured between downwardly extending legs of the angled flanges 140, 144.

A movable portion 150 of the contactor mechanism 124 is pivotably mounted to the stationary portion 132 by means of pivot pins or bolts 152, 154. See FIG. 7. The movable portion 150 supports movable contacts which move into and out of engagement with stationary contacts within each of the vacuum switch means 126-130.

Figure 4:
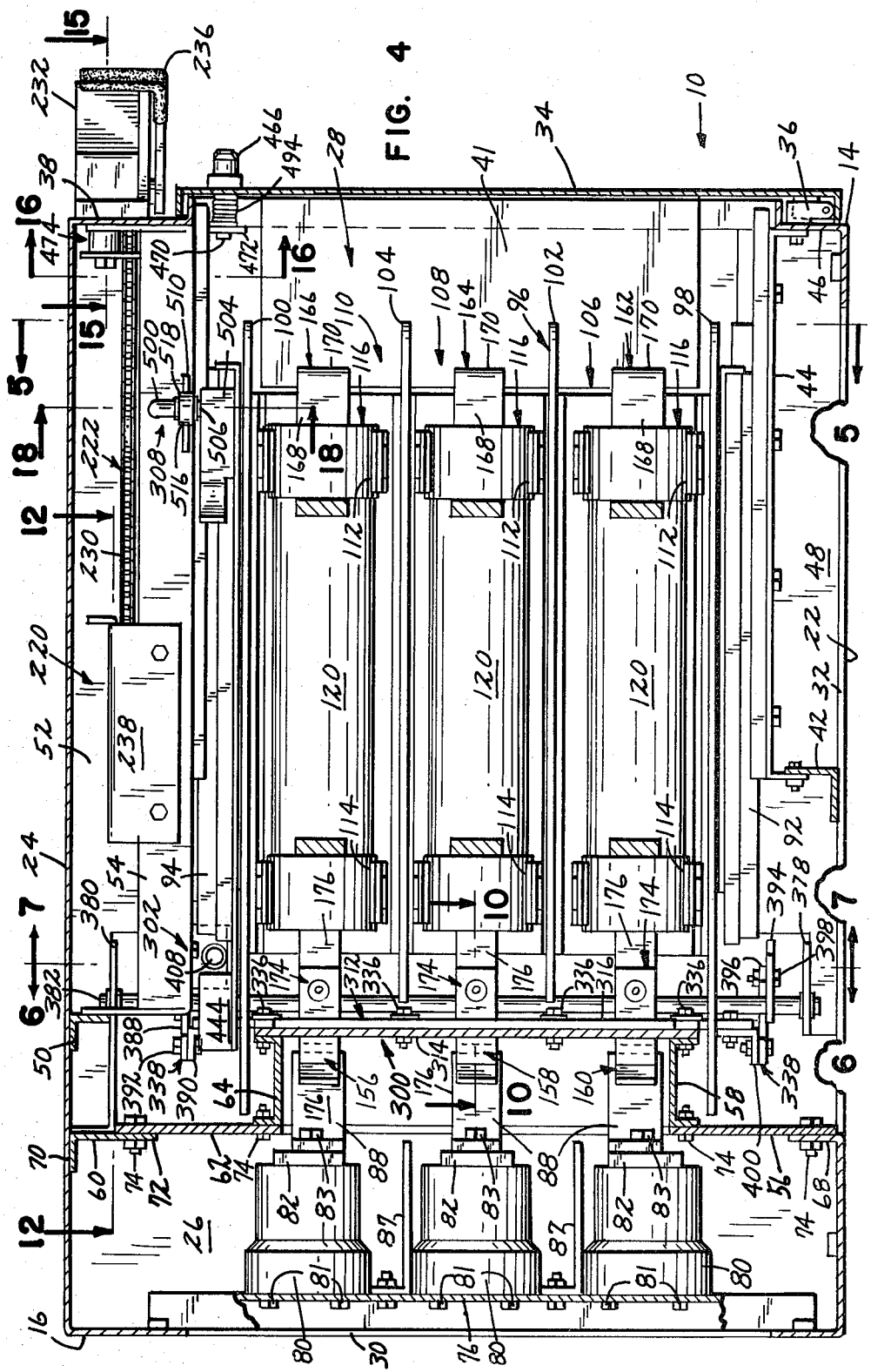
FIG. 4 is a top sectional view taken generally along line 4—4 of FIG. 3.
Figure 5:
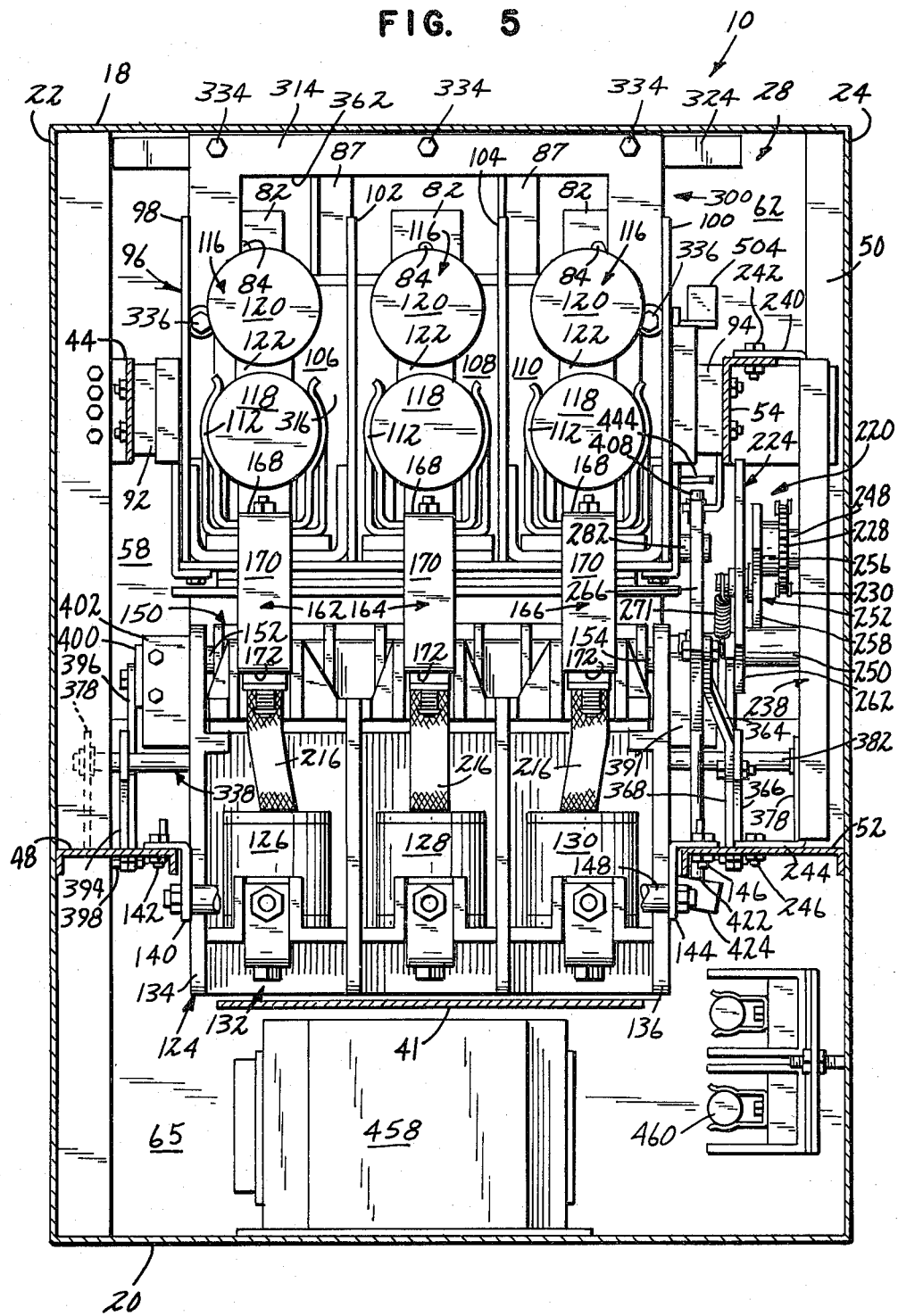
FIG. 5 is a front sectional view taken generally along line 5—5 of FIG. 4.
Figure 12:
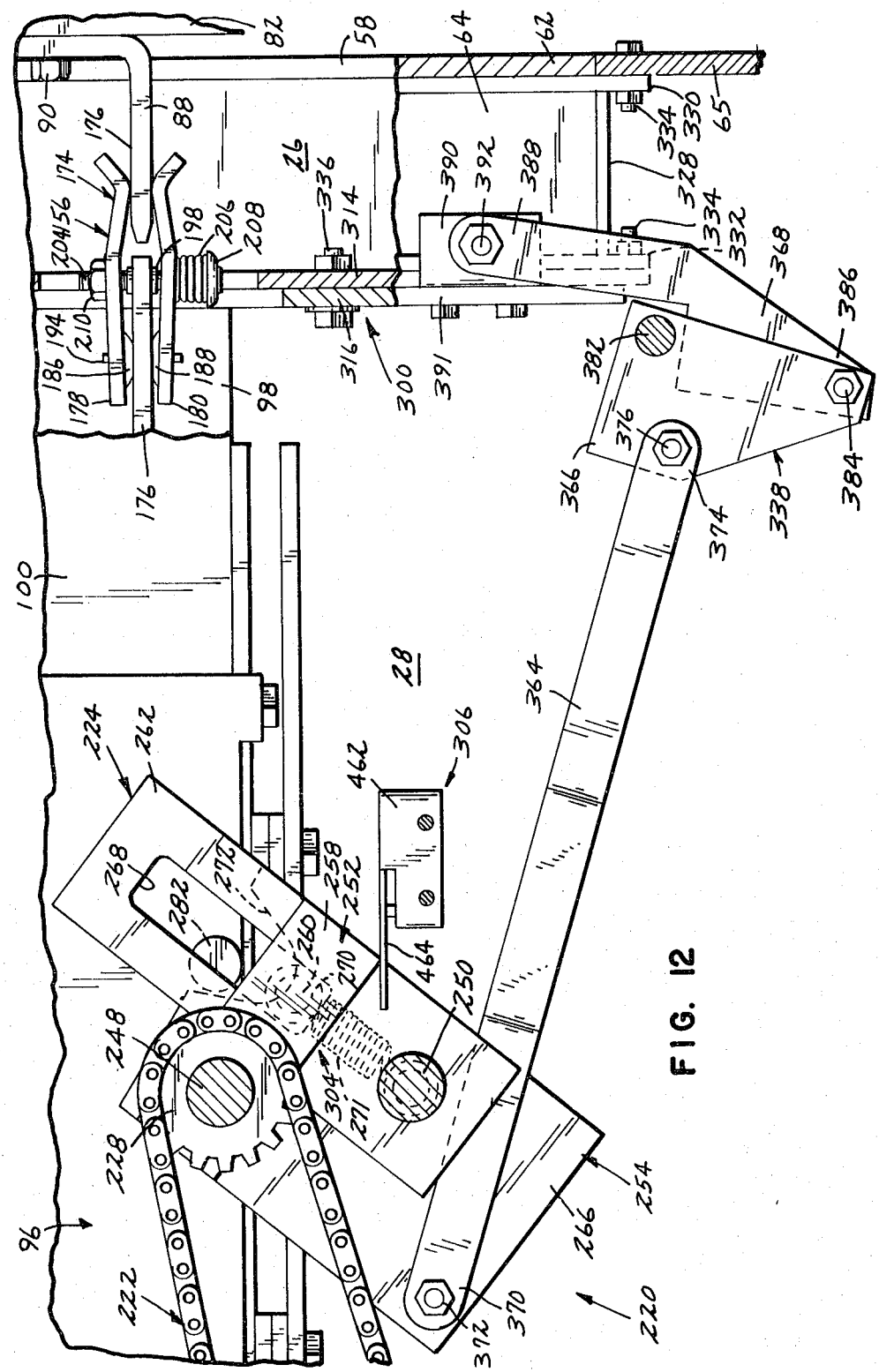
FIG. 12 is an enlarged sectional view taken generally along line 12—12 of FIG. 4.

As is best seen in FIGS. 4 and 12, a plurality of first connector means 156, 158 and 160 each connect one of the fuse units 116 to one of the bus members 82. As is best seen in FIGS. 4 and 5 a plurality of second connector means 162, 164 and 166 each connect one of the fuse units 116 to one of the vacuum switching means 126-130. Portions of the first and second connector members 156-166 which are alike are shown in detail within FIG. 10.

A generally flat stab 172 is removably received within a finger member 174. The finger member 174 is made up of a central member 176, a top member 178 and a bottom member 180. The central member 176 has a curved indentation 182 formed in its top surface and a curved indentation 184 formed in its bottom surface. A hole is formed through the central member 176 in the area of the indentations 182, 184. A curved projection or dimple 186 extends downwardly from the top member 178 and a curved projection or dimple 188 extends upwardly from the bottom member 180. The projection 186 has a hole 190 through it and the projection 188 has a hole 192 through it. The holes 190, 192 are aligned with the hole through the central member 176 and a pin 194 is supported by central member 176. A second hole 196 is formed through the central member 176 spaced from the first hole formed therein in a direction toward the front or receiving portion of the finger member 174. A bearing 198 is supported in the hole 196. A hole 200 is formed through the top member 178 and a hole 202 is formed through the bottom member 180. The holes 200, 202 are in alignment with the hole 196 and a bolt 204 passes therethrough. A biasing spring 206 is received about the bolt 204 and is held in position between the bottom member 180 and the head of the bolt 204 by a retainer ring 208. The bolt 204 is secured to the finger 174 by a locking nut 210.

The front of the members 178, 180 forms a receiving area for the stab 172. The front end of the members 178, 180 is curved and each forms curved contact areas 212, 214 respectively. A stab 172 is received between the curved contact areas 212, 214 and the biasing of the spring 206 provides pressure for contact therebetween. Good contact with the outgoing central member 176 is ensured by utilizing the indentations 182, 184 and the mating projections 186, 188. Thus, if the finger 174 and the stab 172 are slightly misaligned, contact to the central member 176 is still assured.

In the first connector means 156-160, the stab 172 forms a horizontally extending section of the generally L-shaped stab member 88 and the central member 176 extends into the fuse chassis and is placed in electrical contact with a first side of one of the fuse units 116. In the second contactor means 162-166, the stab 172 is connected to a generally upwardly extending section 170 which in turn is connected to a second side of one of the fuse units 116 through a horizontally extending section 168. The central member 176 of the second connector means 162-166 is connected to one of the vacuum switching means 126-130 through a cable type connector 216.

Figure 2:
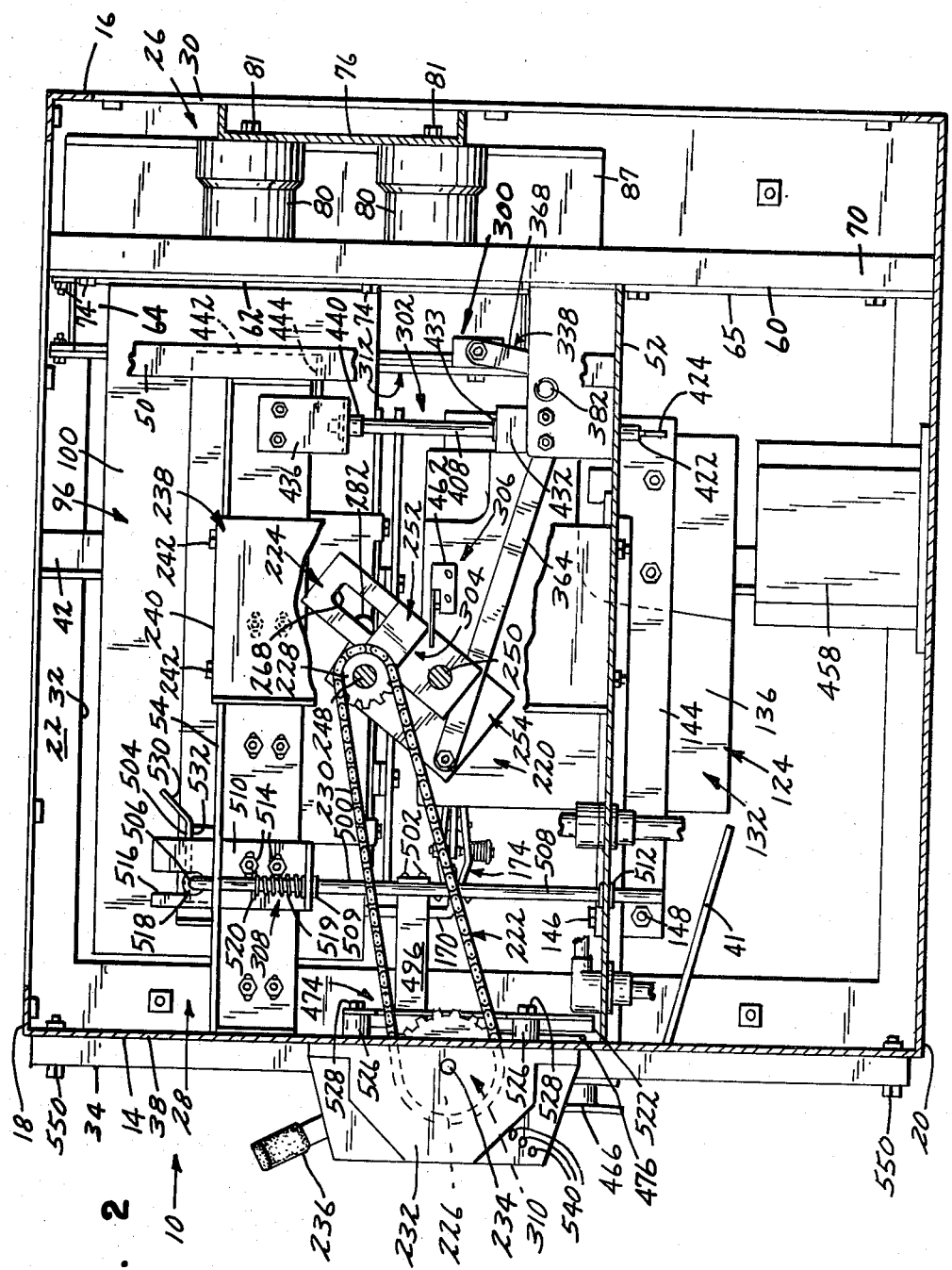
FIG. 2 is a side sectional view taken generally along line 2—2 of FIG. 1.
Figure 3:
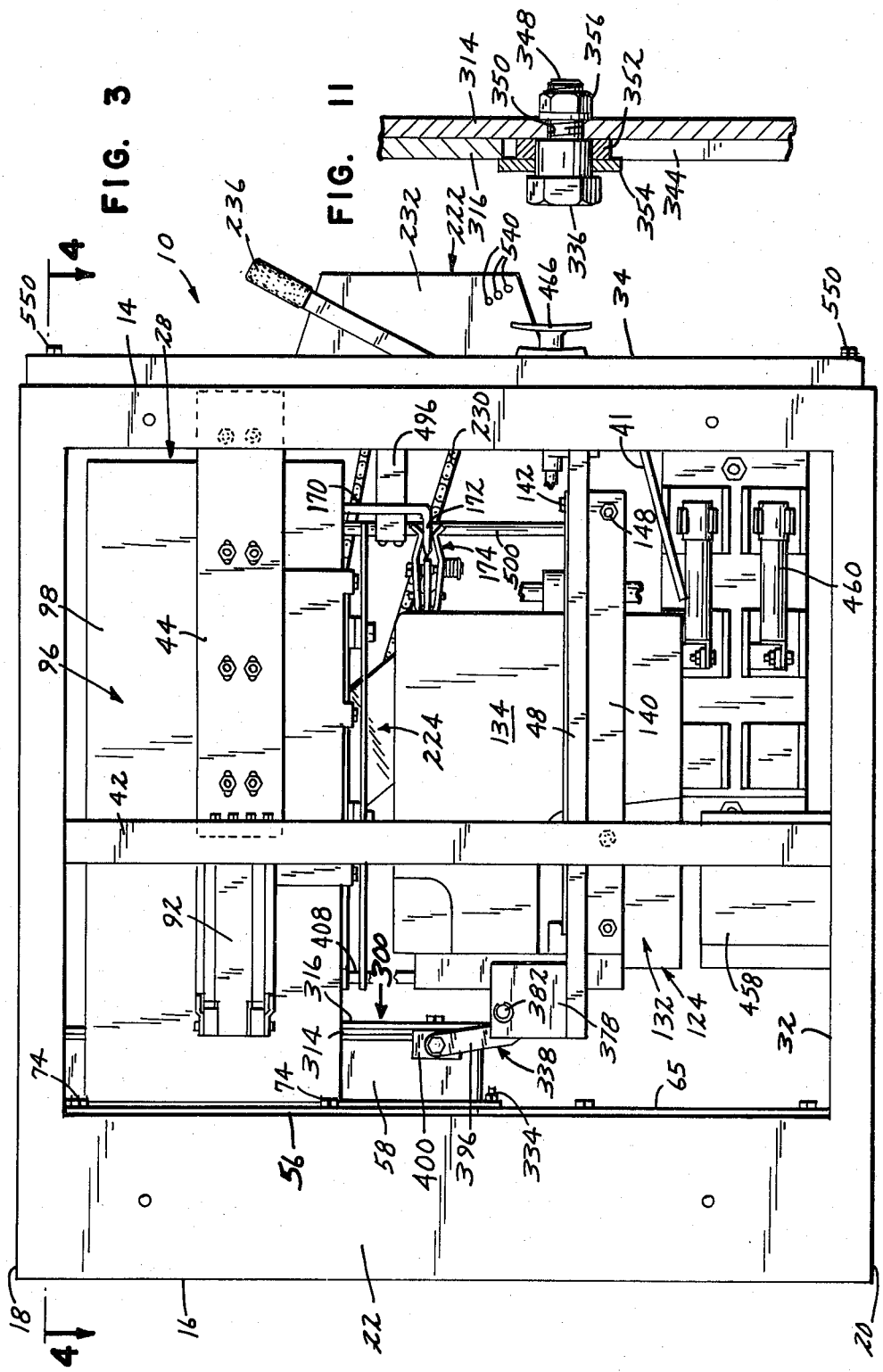
FIG. 3 is a side elevational view taken generally along line 3—3 of FIG. 1.

The fuse chassis 96 is movable between an engaged position and an isolated position. In the engaged position, the first connector means 156-160 place the first end of the fuse units 116 in contact with the bus members 82 and the second connector means 162-166 place the other end of the fuse units 116 in contact with the vacuum switching means 126-130. The first connector means 156-160 in the fuse chassis engaged position are best seen in FIGS. 3, 4 and 12. The second connector means 162-166 in the fuse chassis engaged position is seen in FIGS. 2 and 3. In the isolated position, the fuse units 116 are out of contact with the bus members 82 and also out of contact with the vacuum switching means 126-130. The first connector means 156-160 in the fuse chassis isolated position is shown in FIG. 9. A means for moving the fuse chassis 96 between its engaged and isolated position is indicated generally at 220 in FIG. 2.

The fuse chassis moving means 220 includes a chain driven mechanism 222 and a connecting means 224 for connecting the chain driven mechanism 222 to the fuse chassis 96. Details of the chain driven mechanism 222 and the connecting means 224 are best seen in detail in FIGS. 12-15. The chain driven mechanism 222 includes a first sprocket 226, a second sprocket 228 and an endless chain 230 drivingly received about the two sprockets 226, 228. An outer housing or box 232 is attached to the mounting section 38 of the front face 14. A support shaft 234 is mounted within the control box 232. The first sprocket 226 is received about the shaft 234 and is secured to the shaft 234 for rotation therewith. An actuator handle 236 is secured to the shaft 234 to rotatably drive the shaft 234 and the sprocket 226. The handle 236 is shown in full line in its uppermost position wherein the fuse chassis 96 is in its engaged position and in phantom line in its lowermost position wherein the fuse chassis 96 is moved to its isolated position.

A support plate 238 extends generally vertically between the lower horizontal support member 52 and the upper horizontal support member 54. See FIGS. 2 and 5. The support plate 238 has a top flange 240 which is secured to the horizontal support member 54 by nut and bolt means 242 and a bottom flange 244 secured to the lower horizontal support member 52 by nut and bolt means 246. A first bearing member or axle 248 extends generally perpendicularly from the support plate 238 inwardly from the plate 238 and toward the fuse chassis 96. A second bearing member or axle 250 similarly extends from the supporting plate 238. The axis of the second bearing member 250 is disposed below the axis of the first bearing member 248. The sprocket 228 is supported for rotary motion on the bearing member 248. Thus, the pivoting motion of the actuator handle 236 is transferred as rotary motion to the sprocket 228 through the sprocket 226 and the chain 230.

The rotary motion of the sprocket 228 is transferred as linear reciprocal motion to the fuse chassis 96 by the connecting means 224. The connecting means 224 includes a drive member 252 and a driven member 254. The drive member 252 is rotatably carried on the first bearing member or axle 248 and the driven member 254 is rotatably carried on the second bearing member or axle 250. The drive member 252 is fixedly secured to a face of the second sprocket 228 through a connector 256. The drive member 252 thus rotates or pivots in unison with the sprocket 228. The drive member 252 includes a flat plate 258 and a coupling pin 260 extending generally perpendicularly therefrom in a direction inwardly toward the fuse chassis 96. As seen in FIGS. 12 and 13, the coupling pin 260 is offset a distance from the axis of rotation of the sprocket 228 and of the plate 258 about the axle 248.

The driven member 254 includes a first plate 262, a cylindrical section 264 and a second plate 266. The cylindrical section 264 connects the first and second plates 262, 266 at locations spaced along the axis of the axle 250. Also, the cylindrical section 264 is mounted for rotary motion about the axle 250. The first plate 262 has a slot 268 extending through it. The coupling pin 260 is received within the slot 268. A roller bearing 270 is rotatably held upon the coupling pin 260 and provides the contact area between the coupling pin 260 and the slot 268. A spring 271 has a first end connected to the coupling pin 260 and a second end connected to the cylindrical section 264 of the member 254. The spring 271 provides a biasing force for biasing the coupling pin 260 toward the bottom of the slot 268. A curved indentation 272 is formed in an upper edge 280 of the second plate 266. A drive pin 282 extends from the fuse chassis 96 for reception within the indentation 272.

The fuse chassis 96 is shown in its engaged position in FIG. 12. In the engaged position, the sprocket 228 and the plate 252 have been rotated in a clockwise direction as viewed in FIG. 12. In the engaged position, the coupling pin 260 is in the lowermost position within the slot 268 and the drive pin 282 is received within the indentation 272. To move the fuse chassis 96 from the engaged position to the isolated position, the actuating handle 236 is pivoted counterclockwise as seen in FIG. 15 to thus rotate the sprocket 228 and the plate 252 in a counterclockwise direction. The coupling pin 260 is thus moved counterclockwise and upwardly within the slot 268 against the bias of the spring 271. The coupling pin 260 thus pulls the first plate 262 and, hence, the entire driven member 254 in a counterclockwise direction. The curved surface of the indentation 272 bears against the drive pin 282 and moves the drive pin 282 and the attached fuse chassis 96 to the left in FIG. 12. The counterclockwise-most position of the sprocket 228 and the drive and driven means 252, 254 is shown in FIG. 13.

The coupling pin 260 is again in the lowermost area of the slot 268 and is held thereby by the bias of the spring 271. The fuse chassis 96 is in its isolated position when it has been moved to the position shown in FIG. 13. With the door 34 in its open position, the fuse chassis 96 can be withdrawn further forward out of the switching section 28 to perform servicing functions such as fuse renewal. This is possible since the fuse chassis 96 is held upon a telescoping type of support mechanism and because the drive pin 282 is free to move to the left of FIG. 13 out of the indentation 272. In order to move the fuse chassis 96 back to its engaged position, the fuse chassis 96 and the drive pin 282 must be returned to the position shown in FIG. 13 so that the drive pin 282 may be engaged by the driven member 254.

A plurality of interlock means designated generally as 300, 302, 304, 306, 308 and 310 provide various locking or blocking functions as will be explained hereinafter. The first interlock means 300 includes a barrier means 312 for blocking access to the bus members 82 from the switching section 28 when the fuse chassis 96 is in its isolated position. The second interlock means 302 prevents the withdrawal of the fuse chassis 96 from its engaged position and prevents the movement of fuse chassis 96 from its isolated position to its engaged position when the contactor mechanism 124 is in its activated position. The third interlock means 304 prevents the withdrawal of the fuse chassis 96 from its engaged position except through the activation of the chain driven mechanism 222 and also prevents the insertion of the fuse chassis to its engaged position from its isolated position except through the activation of the chain driven mechanism 222. The fourth interlock means 306 is an electrical interlock means which prevents the activation of the contactor mechanism 124 unless the fuse chassis 96 is in its engaged position. The fifth interlock means 308 prevents the opening of the door 34 when the fuse chassis 96 is in its engaged position. The sixth interlock means 310 prevents the movement of the fuse chassis 96 from its isolated position to its engaged position when the door is open.

The first interlock means 300 is shown in most detail in FIGS. 6, 9, 10 and 12. The barrier means 312 includes a stationary plate 314 and a movable barrier plate 316. An upper cross brace 320 has a generally U-shaped configuration with a first leg 322 secured to the divider members 56, 62 and a second leg 324 secured to the stationary plate 314. A lower cross brace 328 has a generally U-shaped configuration with a first leg 330 secured to the divider member 65 and a second leg 332 attached to a bottom edge of the stationary plate 314. The cross braces 320, 328 are connected to the divider members 56, 62 and 65 and to the stationary plate 314 preferably by means of nuts and bolts 334. In this manner, the stationary barrier 314 is supported between the bus section 26 and the switching section 28.

The movable barrier plate 316 is slidably carried parallel to the stationary plate 314 by a plurality of nut and bolt means 336 and a first linkage means 338. The first linkage means 338 also drivingly couples the movable barrier plate 316 to the fuse chassis moving means 220. The first linkage means 338 is best seen in FIG. 12 and the nut and bolt means 336 is best seen in FIG. 11.

An upper pair of nut and bolt means 336 are received within slots 340, 342 along side edges of the movable barrier plate 316. A lower pair of nut and bolt means 336 are received within slots 344, 346 formed in a generally medial area of the movable barrier plate 316. Each of the nut and bolt means 336 is similarly constructed and hence, only the nut and bolt means 336 received within the slots 344 will be discussed in detail. Referring to FIG. 11, the nut and bolt means 336 is comprised of a shoulder bolt 348 which passes through the slot 344 and a hole 350 through the stationary plate 314. A pair of bearing washers 352, 354 are received about the bolt 348 on the side of the stationary plate 314 which faces the movable barrier plate 316. The first bearing washer 352 is smaller in diameter than the width of the slot 344 and is received therein. The shoulder bolt 348 is formed such that it supports the second bearing washer 354 which has a diameter larger than the diameter of the slot 344 above the outer surface of the movable barrier plate 316 and the first bearing washer 352 in slot 354. The bolt 348 and the bearing washers 352, 354 are held relative to the plates 314, 316 by a nut 356. The nut and bolt means 336 are tightened down such that the movable barrier plate 316 is slidable with respect to the stationary plate 314 yet held parallel thereto.

The stationary plate 314 has a plurality of generally rectangular shaped apertures 358, each of which is in alignment with one of the stab members 88. A plurality of generally rectangular shaped apertures 360 are formed through the movable barrier plate 316. In the fuse chassis engaged position, the apertures 360 are aligned with the apertures 358 as shown in FIG. 6. When the fuse chassis 96 is in its isolated position, the movable barrier plate 316 is moved upwardly by means of the first linkage means 338 so that the apertures 358 and 360 are out of alignment and, hence, a solid wall is presented between the bus section 26 and the switching section 28. A large rectangular hole 362 is formed along the top edge of the stationary plate 314. The hole 362 allows for air circulation when the fuse chassis 96 is in its engaged position. A top portion of the movable barrier plate 316 blocks the hole 362 when the fuse chassis 96 is in its isolated position.

As mentioned above, the first linkage means 338 is drivingly coupled to the fuse chassis moving means 220 to provide the upward and downward sliding motion of the movable barrier plate 316. The first linkage means 338 includes a first link arm 364, a coupling plate 366 and a drive arm 368. The link arm 364 has a first end 370 pivotably coupled to the second plate 266 of the driven member 254 by means of a shoulder bolt 372 and a second end 374 pivotably connected to the coupling plate 366 by shoulder bolt 376. A first rod support member 378 extends upwardly as a flange from the lower horizontal support member 48. A second rod support member 380 extends upwardly as a flange from the lower horizontal support member 52. A rod 382 extends along the lower edge of the movable barrier plate 316 and has first and second ends rotatably supported by the members 378, 380. The coupling plate 366 is fixedly secured to the rod 382 adjacent the support member 380. A shoulder bolt 384 pivotably couples a lower end 386 of the drive arm 368 to the coupling plate 366. An upper end 388 of the drive arm 368 is pivotably coupled to a rearwardly extending flange 390 by nut and bolt 392. The flange 390 is secured to an ear 393 extending from the movable barrier plate 316. A second coupling plate 394 is fixedly secured to the rod 382 adjacent the support member 378. A second drive arm 396 is similarly pivotably coupled to the coupling plate 394 by a shoulder bolt 398. The second drive arm 396 is also pivotably attached to a second rearwardly extending flange 400 which is secured to an ear 402 extending from the movable barrier plate 316.

The linkage means 338 is shown in FIG. 12 pivoted to a position wherein the apertures 358, 360 are aligned and the fuse chassis 96 is in the engaged position. In this position, the first link arm 364 is moved to the left of FIG. 12 and the coupling plate 366 and the drive arm 368 are pivoted to their downward most positions. In FIG. 9, the movable barrier plate 316 is shown in its blocking position wherein the fuse chassis has been moved to the isolated position. In this position, the link arm 364 is moved to the right such that both the coupling plate 366 and the drive arm 368 have been pivoted upward to thus slide the movable barrier plate 316 upwardly. Since the second coupling plate 394 is fixedly secured to the rod 382, the second coupling plate 394 and the second drive arm 396 are similarly pivoted upward. In this position, access to the bus section 26 from the switching section 28 is blocked.

Figure 7:
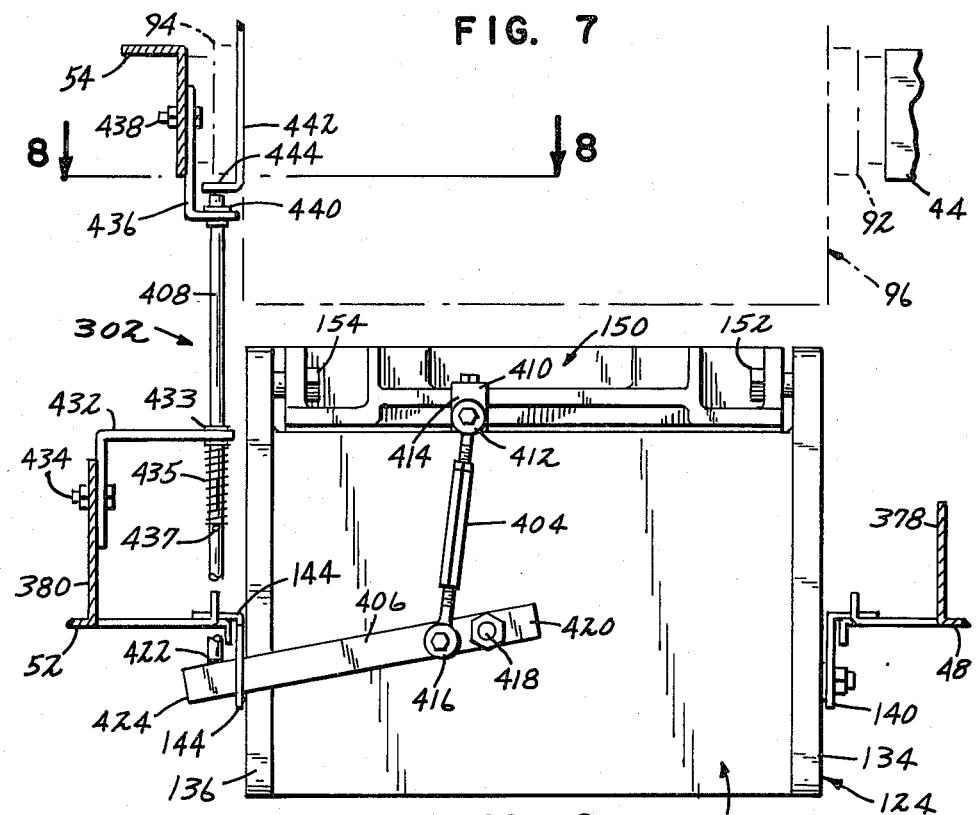
FIG. 7 is a sectional view taken generally along line 7—7 of FIG. 4, illustrating the second interlock means.
Figure 8:
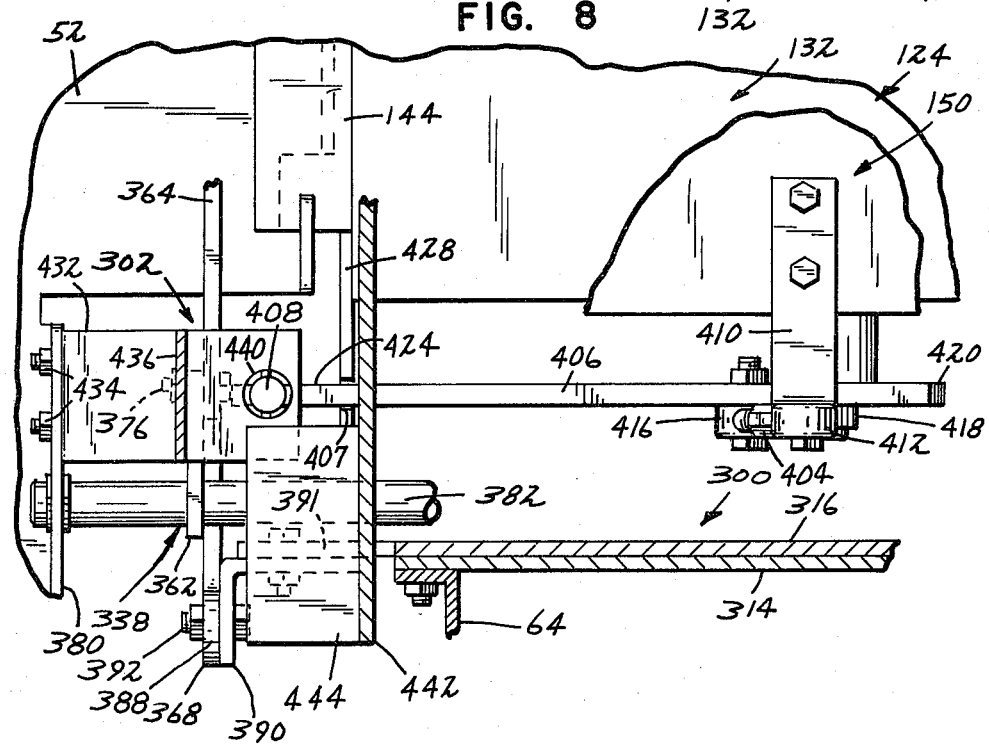
FIG. 8 is an enlarged sectional view taken generally along line 8—8 of FIG. 7.

The second interlock means 302 is best seen in FIGS. 7 and 8. The second interlock means includes a connecting link 404, an arm 406 and a blocking rod 408. An angled plate or flange 410 is fixedly secured to the movable portion 150 of the contactor mechanism 124. A first end 412 of the connecting link 404 is pivotably attached to a downwardly extending portion 414 of the plate 410. A second end 416 of the connecting link 404 is pivotably attached to a portion of the arm 406. The arm 406 is pivotably attached to the stationary portion or frame 132 of the contactor mechanism 124. The arm 406 is pivotable about a retaining means 418 which secures the arm 406 to the stationary portion 132 adjacent its first end 420. A lower end 422 of the blocking rod 408 contacts to a second end 424 of the arm 406. A guide flange 426 is attached to a top surface of the lower horizontal support member 54 and has a leg 428 extending rearwardly toward the arm 406. A slot 407 is formed in the leg 428 for receiving and guiding the arm 406. See FIG. 8. A lower guide bracket 432 is secured to the support member 380 by nut and bolt 434. The guide bracket 432 takes on the form of an angled plate having a horizontal section. The horizontal section has a hole for receiving a cylindrical bearing or retainer 433. The bearing 433 guides the blocking rod 408. An upper guide bracket 436 is secured to the upper horizontal support member 54 by a nut and bolt 438. The upper guide bracket 436 takes on the form of an angled plate having a horizontal section. The horizontal section has a hole through it for receiving and guiding the blocking rod 408. A cylindrical bearing or retainer 440 is received about the rod at its upper end and is carried within the hole of the upper guide bracket 436. The lower end 422 is flat and abuts the upper surface of the end 424 of the arm 406. The blocking rod 408 is biased downwardly toward the arm 406 by a spring 435. The spring 435 is received about the rod 408 and has a first end in contact with a bottom surface of the horizontal section of the guide bracket 432 and a second lower end in contact with a pin 437 which is secured to the blocking rod 408. The end 422 is not secured to the arm 406 so that the entire contactor mechanism 124 can be removed from the housing 12 without having to perform a difficult disconnect function in the area of the blocking rod 408.

An angled flange 442 having a horizontally extending portion 444 is attached to a side edge of the fuse chassis 96. In FIG. 8, the fuse chassis would be in its engaged position and the flange 442 is disposed rearward of the blocking rod 408. If the contactor mechanism 124 were activated, the front end of the movable portion 150 would pivot downwardly and the rear end would pivot upwardly. This upward motion would pull the contactor arm 406 and, hence, move the blocking rod 408 upward. In such an upward blocking position, the upper end of the blocking rod 408 would be above the level of the horizontal section 444 of the flange 442. Thus, with the contactor mechanism 124 activated, the fuse chassis 96 cannot be withdrawn from its engaged position because of the blocking disposition of the rod 408 with respect to the flange 442. Similarly, if the fuse chassis 96 were in its isolated position, the flange 442 would be disposed forward of the blocking rod 408. If in this situation, the contactor mechanism 124 were activated and the blocking rod 408 raised, the fuse chassis 96 could not be moved rearwardly to its engaged position. The second interlock means 302 thus provides an isolating function related to the position of the contactor mechanism 124.

Figure 19:
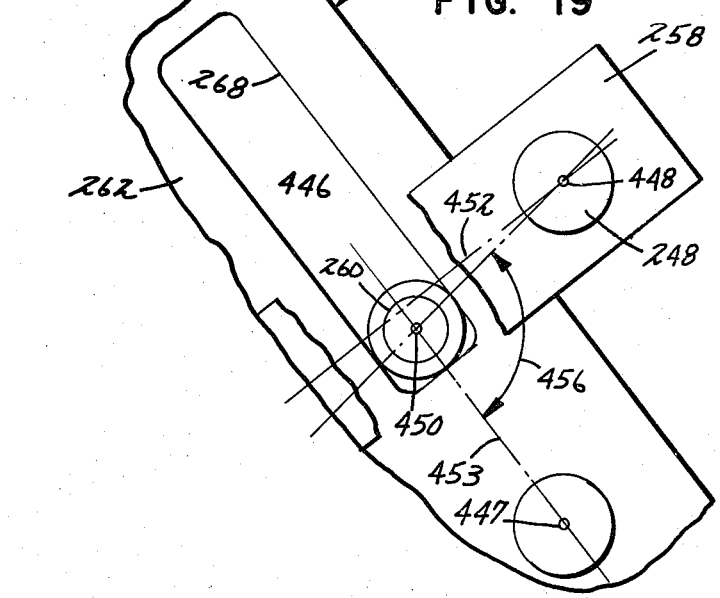
FIG. 19 is a view illustrating element of the third interlock means in an exaggerated relationship for purposes of explanation.

The third interlock means 304 can be best understood by reference to FIGS. 12, 13 and 19. The third interlock means 304 accomplishes its purpose of preventing the movement of the fuse chassis 96 from its engaged position and of preventing the insertion of the fuse chassis 96 to its engaged position from its isolated position except through the activation of the chain drive mechanism 222 by the interrelationship between the coupling pin 260 at its two extreme locations and the location of the axis of rotation of the sprocket 228. In its extreme positions, the coupling pin 260 is pivoted downwardly far enough into the slot 268 so that any attempted rotation of the driven member 254 independent of the chain drive mechanism 222 would tend to drive the coupling pin 260 downwardly into the slot 268. The interrelationship between the coupling pin 260 and the axis of rotation of the gear wheel 228 is shown in an exaggerated condition for purposes of clarity within FIG. 19. As seen therein, any attempted rotation of the plate 262 in the counterclockwise direction as shown by arrow 446 would tend to drive the coupling pin 260 downwardly toward the axis of rotation of the driven member 254 and the plate 262. The axis of rotation of the plate 262 is shown as 447 in FIG. 19. That is, the plate 258 would tend to be rotated in a counterclockwise direction about its axis 448. Mechanical locking thus occurs and the plate 262 cannot be pivoted. The mechanical locking occurs because the center 450 of the coupling pin 260 is disposed below a line 452 which extends from the axis of rotation 448 of the sprocket 228 and which intersects the slot 268 perpendicularly. Attempted rotation of the plate 262 in a counterclockwise direction causes a force vector to be applied to the pin 260 in a direction perpendicular to the longitudinal wall of the slot 268 and generally toward the axis of rotation 448. Since the center 450 is below the line 452 such a force vector would tend to cause rotation of the plate 258 in a counterclockwise direction. If the center 450 were aligned with the line 452 the attempted rotation of the plate 262 would drive the coupling pin 260 toward the center 454, and if the center 450 were located above the line 452 locking would not occur since the attempted rotation of the plate 262 would tend to slide the coupling pin 260 upwardly within the slot 268. An alternative way of describing the relationship between the cam plate center 450 and the axis of rotation 448 is that the included angle 456 between the line 452 and a line 453 from the center 450 to the axis 447 is greater than 90 degrees. The off-center relationship between the coupling pin 260 and the axis of rotation 448 is shown in an exaggerated manner in FIG. 19 because the off-centering is too slight to be shown and adequately described in FIGS. 12 and 13. Thus, as seen in FIG. 12, the fuse chassis 96 could not be pulled and the drive pin 282 could not force the rotation of the driven member 254 counterclockwise. Similarly, as seen in FIG. 13, the fuse chassis 96 could not be forced inwardly and the drive pin 282 could not force the rotation of the driven member 254 clockwise.

After current has passed from the bus members 82 through the fuse units 116 current is passed through the contactor mechanism 124. A portion of the current which has passed through the fuse units 116 is tapped prior to passing through the contactor mechanism 124 and passed through a fuse mechanism 460 and then through a step down transformer 458. The low voltage current from the secondary of the transformer 458 is used to activate and deactivate the contactor mechanism 124. The flow of the low voltage current to the contactor mechanism 124 is controlled via external low-voltage devices (not shown). The fourth interlock means 306 is an electric interlock means which prevents the activation of the contactor mechanism 124 by the low voltage current from the transformer 458 unless the fuse chassis 96 is in its engaged position. The fourth interlock means 306 is comprised of a microswitch 462 which has an actuator arm 464 extending from it. The microswitch 462 is placed in direct line with the low-voltage secondary of the transformer 458. As seen in FIG. 12, the actuator arm 464 is contacted by a portion of the plate 252 when the fuse chassis 96 is in its engaged position. As seen in FIG. 13, the actuator arm 464 is out of contact with the plate 258 when the fuse chassis 96 is in its isolated position. The low voltage current from the transformer 458 can only activate the contactor mechanism 124 when the actuator arm 464 of the microswitch 462 has been activated, i.e. when the plate 258 has contacted the arm 464. So that the operation of the contactor mechanism 124 may be tested, the microswitch 462 may be bypassed by supplying low voltage current independent of the transformer 458.

A rotatable handle 466 is mounted to the exterior of the door 34. A cylindrical portion 468 of the handle 466 passes through a hole through the door 34 and is carried within the hole. A rectangular shaped connecting member 470 extends inwardly through the portion 468 and is rotatable therein. An actuator bar 472 is attached to the connecting member 470 for rotation therewith. The actuator bar 472 activates a latching mechanism 474 for locking the door 34 in a closed position. The latching mechanism 474 includes a latch plate 476 and a flange 478. The latch plate 476 is pivotably mounted about a bolt 480 adjacent an edge of the door 34. A spring 482 is mounted about the bolt 480 and contacts a pair of pins or projections 484, 486. The pin 48 is attached to the latch plate 476 and the pin 484 is attached to a guide plate 522. The spring 482 biases the latch plate 476 away from the flange 478 to the position shown in FIG. 17 wherein the door 34 is free to open. The flange 478 has a slot 490 extending through a portion 492 of the flange 478 which extends generally perpendicularly from the inner face of the door 34. When the actuator arm 472 is pivoted to the position shown in FIG. 16, it contacts a lower portion of the latch plate 476 and moves the latch plate 476 against its bias. This motion of the latch plate 476 places an upper latching end of the plate 476 within the slot 490. The door 34 is thus locked closed. A spring 494 is coupled to the actuator bar 472 to bias the actuator bar into contact with the latch plate 476. The spring 494 aids in preventing accidental rotation of the actuator bar 472.

The fifth interlock means prevents the opening of the door 34 when the fuse chassis 96 is in its engaged position. The fifth interlock means includes a blocking plate 496 which holds the latch plate 476 within the slot 490 when the fuse chassis 96 is in the engaged position. That is, the blocking plate 496 blocks or prevents the return of the latch plate 476 out of the slot 490 to the position shown in FIG. 17. The fifth interlock means 308 also includes a means, identified generally as 498, for moving the blocking plate 496 into the holding or blocking position. The moving means 498 includes a follower rod 500 to which the locking plate 496 is secured by suitable means, such as screw 502, and a cam plate 504 which is attached to a side of the fuse chassis 96. The follower rod 500 includes a generally horizontally extending follower section 506 and a guide or support leg 508 extending downwardly from the follower section 506.

The leg 508 passes through a hole in the upper horizontal support member 54, through a bearing 509 a hole in a horizontal section of an upper support flange 510 and through a bearing 512 received within a hole in the lower support member 52. The upper support flange 510 is secured to a vertically extending portion of the support member 54 by nut and bolt means 514. A vertically extending section of the support flange 510 extends through a slot in the upper horizontal support member 54 and has a guide groove 516 extending downwardly from an upper edge. See FIG. 2. A roller 518 is carried on the vertical section 508 of the follower rod 498 and is received within the guide groove 516. A spring 518 is received about the leg 508 of the follower rod 498 and has a first end in contact with the horizontal section of the support flange 510 and an upper end in contact with a pin 520 secured to the leg 508. Spring 518 thus biases the follower rod 498 upwardly.

As best seen in FIG. 2, the blocking plate 496 extends forwardly from the follower rod 498 to the area of the latching mechanism. The guide plate 522 having a slot 524 is attached to the outer housing 232. Spacer blocks 526 are interposed between the guide plate 522 and the outer housing 232. Screws 528 pass through holes in the guide plate 522 and in the spacer blocks 526 and are screwed into the outer housing 532. In this manner, the guide plate 522 is supported slightly inward of the front face 14.

The cam plate 504 has a downwardly sloping surface 530 and a horizontal surface 532. As the fuse chassis 96 is moved inwardly towards its engaged position, the downwardly sloping surface 530 contacts the follower section 508 and gradually forces the follower rod 498 downwardly. The horizontal surface 532 holds the follower rod 498 in its lower most position when the fuse chassis 96 is in its engaged position. In this manner, the blocking plate 496 is lowered to its blocking position which prevents the removal of the latch plate 476 from the slot 490.

The sixth interlock means 310 prevents the movement of the fuse chassis 96 from its isolated position to its engaged position when the door 34 is opened. The sixth interlock means 310 includes a locking projection 534 which is formed integral with the latching plate 476 and extends toward the sprocket 226. The sprocket 226 has a hole 536 through it for receiving the locking projection 534. When the sprocket 226 is rotated to the position wherein the fuse chassis 96 is in its isolated position, the hole 536 is aligned with the locking projection 534. If the drawer is open or the actuator bar 472 is out of contact with the latching plate 476, the spring 582 biases the latching plate to the position shown in FIG. 17 wherein the locking projection 534 is received within the hole 536. In this manner, the handle 236 cannot be rotated until the door 34 is closed and the actuator bar 472 moves the latching plate 476 in a clockwise direction so that the door 34 is locked and the locking projection 534 has been moved out of the hole 536.

The flange 478 is attached to the interior surface of the door 34 by means of a pair of allen screws 538. The attachment of the flange 478 by the allen screw 538 is for the purpose of providing an override mechanism for the door lock. Thus, if the chain 230 should break or if the fuse chassis 96 cannot be moved to its isolated position, the flange 478 could be removed so that the door 34 could be opened and repairs be made. The door 34 can additionally be locked or secured shut by means of bolts 550.

A plurality of holes 540 are formed in a lower portion of the control box 232. The holes 540 permit a pad lock to be attached to the control box 232 to lock the handle in open position. Similarly, additional holes can be formed in the upper portion of the control box 232 to lock the handle 236 in the fuse chassis engaged position. A generally circular plate 542 is attached to the support pin 234 for rotation therewith. The plate 242 has a pair of indentations or cutouts 544. The indentations 544 are adapted to couple with a conventional Kirk key interlocking mechanism. The Kirk key interlocking mechanism could be used to also lock the actuating handle 236 in either of the fuse chassis engaged or the fuse chassis isolated positions.

OPERATION

The operation of the apparatus 10 will be broadly summarized in the following manner. The summary will begin with the fuse chassis 96 in its engaged position and describe the positioning of the various interlock means 300–310. Thereafter, the motion of the fuse chassis 96 from its engaged to its isolated position will be described in conjunction with the motion of the various interlock means 300–310. Finally, the motion of the fuse chassis 96 from its isolated to its engaged position, together with the motion of the various means 300–310 will be described.

The fuse chassis 96 in its engaged position is seen in FIGS. 2, 3 and 4. In the fuse chassis engaged position, the first connector means 156–160 connect each bus bar 82 with a first end of a fuse unit 116 and the second connector means 162–166 connects a second end of each fuse units 116 to a vacuum switch 126–130 of the contactor mechanism 124. In the fuse chassis engaged position, the movable barrier plate 316 is in its downward position shown in FIGS. 6 and 12. If an electrically actuated device is to be driven by the incoming high voltage, the contactor mechanism 124 must be activated. When the contactor mechanism 124 is activated, the back of the movable portion 150 pivots upwardly and moves the blocking rod 408 upwardly to a blocking position through the connecting link 404 and the arm 406. The blocking rod 408 prevents the motion of the fuse chassis 96 from its engaged position by being in abutting relation to the horizontal section 444 of the angled flange 442. The chain drive mechanism 222 and the connecting means 224 are in their positions shown in FIG. 12. The fuse chassis 96 cannot be pulled from its engaged position by the off-set interrelationship between the axis 448 of rotation of the gear wheel 228 and the location of the coupling pin 260. The microswitch 462 of the fourth interlock means 306 is in its activated state and thus permits the contactor mechanism 124 to be activated as described above. The door 34 is in its closed position and the latch plate 476 engaged in the slot 490. The latch plate 476 is prevented from moving out of the slot 490 because the blocking plate 496 is in its lowermost position. The blocking plate 496 is in its lowermost position because the cam plate 504 has pushed the follower rod 498 downwardly. Finally, the handle 236 is permitted to rotate because the locking projecting 534 is pivoted out of the hole 536 of the first gear wheel 226.

In order to move the fuse chassis 96 from its engaged position to its isolated position, the blocking rod 408 of the second interlock means 302 must first be moved downwardly. To accomplish this, the contactor mechanism 124 must first be deactivated. Thereafter, the handle 236 may be pivoted downwardly and the chain driven mechanism 222 pivots the connecting means 224 in a counterclockwise direction as seen in the drawings. The drive pin 282 is thus forced to the left as seen in FIGS. 2 and 12. The rotation of the connecting means 224 moves the movable barrier plate 316 upwardly by means of the first linkage means 338. The cam plate 504 is moved forward so that the blocking plate 496 is moved upwardly by the bias of the spring 518. The handle 466 can then be rotated so that the actuator bar 472 is out of contact with the latch plate 476. The door 34 can thereafter be pivoted to its opened up position and the fuse chassis 96 can be pulled further outward along the telescoping support mechanism 92.

To move the fuse chassis 96 from its isolated position to its engaged position, the handle 236 must be pivoted upwardly. The third interlock means 304 prevents manually forcing the fuse chassis 96 to its engaged position without pivoting the handle 236. However, in order to pivot the handle 236 upwardly, the door 34 must be locked. That is, the locking projection 534 of the sixth interlock means 310 prevents the rotation of the gear wheel 226 and the attached handle 236 until the actuator bar 272 moves the latch plate 476 to the door locked position. Thereafter, the handle 236 may be pivoted upwardly and the chain driven mechanism 222 pivots the connecting means 224 in the clockwise direction as seen in FIGS. 2 and 13. The groove or indentation 272 engages the drive pin 282 and moves the fuse chassis to the right to its engaged position. This motion of the connecting means 224 causes the first linkage means 238 to pivot the movable barrier 316 to its lower position wherein the apertures 358 and 360 are aligned. In the engaged position, the microswitch 462 is activated and, hence, the contactor mechanism 124 can be activated. The fuse chassis 96 is thus again in its engaged position.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

We claim:

1. A switching apparatus for use in an electrical control device comprising:
   a housing having a switching section and a bus section, said bus section having at least one bus member for supplying incoming electrical current;
   a fuse chassis attached to said housing for reciprocal movement into and out of the switching section of said housing;
   means holding at least one fuse in said fuse chassis;
   a contactor mechanism supported in the switching section of said housing forward of said bus section and vertically away from said fuse chassis for connecting and disconnecting flow of current from said at least one bus member to an electrically actuated device, said contactor mechanism being movable between an activated and a deactivated position wherein current is capable of flowing from said at least one bus member to the electrically activated device in said activated position but not in said deactivated position;
   first connector means for connecting a first end of said at least one fuse to said at least one bus member, said first connector means including a discrete bus contact connected to said at least one bus member and a first descrete fuse contact engaging a first end of said at least one fuse, said first fuse contact being located at the rearward end of said fuse chassis;
   second connector means for connecting a second end of said at least one fuse to said contactor mechanism, said second connector means including a second discrete fuse contact for engaging a second end of said at least one fuse and a discrete contactor contact for connecting said second fuse contact to said contactor mechanism;
   a door attached to a front face of said housing for pivotal motion between an open and a closed position; and
   means for moving said fuse chassis between an engaged position and an isolated position, said first and second connector means connecting said at least one fuse between said at least one bus member and said contactor mechanism in said engaged position and said at least one fuse being disconnected from both said at least one bus member and said contactor mechanism in said isolated position, said fuse chassis moving means being actuated from outside said housing.

2. An apparatus in accordance with claim 1 wherein said contactor mechanism includes a plurality of vacuum switching means for performing the connecting and disconnecting function, and wherein said apparatus includes a plurality of said at least one bus member, a plurality of said bus contacts, one of said bus contacts being connected to each bus member, a plurality of said at least one fuse, a plurality of said first discrete fuse contacts, one of said first discrete fuse contacts engaging the first end of each fuse, a plurality of said second discrete fuse contacts, one of said second discrete fuse contacts engaging the second end of each fuse, and a plurality of said discrete contactor contacts, one of said discrete contactor contacts for connecting each one of said second fuse contacts to one of said vacuum switching means.

3. An apparatus in accordance with claim 2 wherein divider members divide said fuse chassis into a plurality of compartments, said fuse holding means holding at least one fuse in each compartment, the fuses of each compartment being in conductive contact with one of said bus members when said fuse chassis is in the engaged position.

4. An apparatus in accordance with claim 3 wherein said contactor mechanism is supported in said housing below said fuse chassis.

5. An apparatus in accordance with claim 4 wherein each of said bus contacts is comprised of generally flat stab extending forwardly and horizontally from one of the bus members, each of said second fuse contacts is comprised of a generally flat stab having a vertical portion extending generally vertically downward from a front end of said fuse chassis and a horizontal portion extending generally horizontally and rearwardly from said vertical portion, each of said first fuse contacts and each of said contactor contacts being comprised of a pair of fingers, each pair of fingers being adapted to receive on of said stabs in the engaged position of said fuse chassis.

6. An apparatus in accordance with claim 5 wherein each finger is comprised of a central member, a top member disposed generally above a top surface of the central member, and a bottom member disposed generally below a bottom surface of the central member, the top and bottom surface of said central member each having a curved indentation formed therein and a first hole extending through the central member in the area of said indentations, said central member having a second hole formed through it, each of said fingers having a generally curved projection extending from it for reception in one of said indentations, each projection having a hole through it for alignment with the first hole of said central member, a pin passing through the holes of said projections and through the first hole of said central member, a retaining member passing through a pair of second holes in said fingers and passing through the second hole of said central member, and means for biasing a front portion of said fingers into contact with one another.

7. An apparatus in accordance with claim 2 including interlock means comprising barrier means for blocking access to said bus members from the switching section when said fuse chassis is in the isolated position.

8. An apparatus in accordance with claim 7 wherein said barrier means includes a stationary plate interposed between said switching section and said bus section, said stationary plate having apertures for permitting said first connector means to connect the first ends of said fuses to said bus members, a movable barrier plate having a solid portion for blocking the apertures of said stationary plate when said fuse chassis is in the isolated position, said movable barrier plate having apertures for alignment with the apertures of said stationary plate when said fuse chassis is in the engaged position, and means for moving said barrier plate between a position wherein the apertures of said stationary plate are blocked and a position wherein the apertures of said barrier plate are in alignment with the apertures of said stationary plate.

9. An apparatus in accordance with claim 8 wherein said barrier plate moving means includes first linkage means for operatively connecting the barrier plate moving means to the fuse chassis moving means.

10. An apparatus in accordance with claim 9 wherein said first linkage means includes a first link arm, a coupling plate, a rod and a drive arm, said first link arm having a first end pivotably coupled to a portion of said fuse chassis moving means and a second end pivotably coupled to said coupling plate, said rod being supported within said switching section, said coupling plate being carried by said rod for rotary motion about its axis, said drive arm having a first section pivotably coupled to said coupling plate and a second section pivotably coupled to said movable barrier plate, means for attaching said movable barrier plate to said stationary plate for parallel motion relative to said stationary plate, whereby the pivoting of said coupling plate about the axis of said rod moves said barrier plate upwardly and downwardly.

11. A switching apparatus for use in an electrical control device comprising:
a housing having a switching section and a bus section, said bus section having at least one bus member for supplying incoming electrical current;
a fuse chassis attached to said housing for reciprocal movement into and out of the switching section of said housing;
means holding at least one fuse in said fuse chassis;
a contactor mechanism supported in the switching section of said housing for connecting and disconnecting flow of current from said bus member to an electrically actuated device, said contactor mechanism being movable between an activated and a deactivated position wherein current is capable of flowing from said bus member to the electrically activated device in said activated position but not in said deactivated position;
first connector means for connecting a first end of said fuse to said bus member;
second connector means for connecting a second end of said fuse to said contactor mechanism;
a door attached to a front face of said housing for pivotal motion between an open and a closed position;
means for moving said fuse chassis between an engaged position and an isolated position, said first and second connector means connecting said fuse between said bus member and said contactor mechanism in said engaged position and said fuse being disconnected from both said bus member and said contactor mechanism in said isolated position, said fuse chassis moving means being actuated from outside said housing; and
interlock means comprising barrier means for blocking access to said bus members from the switching section when said fuse chassis is in the isolated position, said barrier means including a stationary plate interposed between said switching section and said bus section, said stationary plate having apertures for permitting said first connector means to connect the first ends of said fuses to said bus members, a movable barrier plate having a solid portion for blocking the apertures of said stationary plate when said fuse chassis is in the isolated position, said movable barrier plate having apertures for alignment with the apertures of said stationary plate when said fuse chassis is in the engaged position, and means for moving said barrier plate between a position wherein the apertures of said stationary plate are blocked and a position wherein the apertures of said barrier plate are in alignment with the apertures of said stationary plate;
said barrier plate moving means including first linkage means for operatively connecting the barrier plate moving means to the fuse chassis moving means, said first linkage means including a first link arm, a coupling plate, a rod and a drive arm, said first link arm having a first end pivotably coupled to a portion of said fuse chassis moving means and a second end pivotably coupled to said coupling plate, said rod being supported within said switching section, said coupling plate being carried by said rod for rotary motion about its axis, said drive arm having a first section pivotably coupled to said coupling plate and a second section pivotably coupled to said movable barrier plate, means for attaching said movable barrier plate to said stationary plate for parallel motion relative to said stationary plate whereby the pivoting of said coupling plate about the axis of said rod moves said barrier plate upwardly and downwardly.

12. An apparatus in accordance with claim 11 wherein said contactor mechanism includes a plurality of vacuum switching means for performing the connecting and disconnecting function and wherein said apparatus includes a plurality of said at least one bus member, a plurality of said bus contacts, one of said bus contacts being connected to each bus member, a plurality of said at least one fuse, a plurality of said first discrete fuse contacts, one of said first discrete fuse contacts engaging the first end of each fuse, a plurality of said second discrete fuse contacts, one of said second discrete fuse contacts engaging the second end of each fuse, and a plurality of said discrete contactor contacts, one of said discrete contactor contacts for connecting each one of said second fuse contacts to one of said vacuum switching means.

13. An apparatus in accordance with claim 10 or 11 wherein said rod extends across a width wise dimension of said barrier plate, a first bearing member supported in said housing for rotatably supporting a first end of said rod and a second bearing member attached in said housing for rotatably supporting a second end of said rod, said first link arm, said coupling plate, and said drive arm being disposed adjacent said first end, said coupling plate being fixedly secured to said rod for rotary motion therewith, a second coupling plate being fixedly secured to said rotatable rod adjacent to its second end, and a second drive arm having a first section pivotally secured to said second coupling plate and a second section pivotably secured to said movable barrier plate.

14. An apparatus in accordance with claim 1 or 2 including interlock means for preventing the withdrawal of said fuse chassis from its engaged position and for preventing the movement of said fuse chassis from its isolated position to its engaged position when said contactor mechanism is in its activated position.

15. An apparatus in accordance with claim 14 wherein said interlock means includes linkage means and a movable blocking means, said linkage means being coupled to a movable portion of said contactor mechanism and to said movable blocking means for transferring motion of said movable portion of the contactor mechanism to said blocking means, and said movable blocking means obstructing the motion of said fuse chassis when said contactor mechanism is activated.

16. An apparatus in accordance with claim 15 wherein said linkage means includes a connecting link, an arm and a blocking rod, said connecting link having a first end pivotably connected to the movable portion of said contactor mechanism and a second end, said arm having a stationary pivot point about which it pivots, said blocking rod having a first end in contact with said arm at a location spaced from said pivot point, the second end of said connecting link being connected to said arm intermediate its pivot point and the point of contact with said blocking rod whereby upward and downward motion of said connecting link moves said blocking rod upwardly and downwardly, a flange member extending from said fuse chassis and being disposed rearward of said blocking rod in the fuse chassis engaged position and forward of said blocking rod in fuse chassis isolated position whereby the motion of the fuse chassis beyond said blocking rod is prevented when said blocking rod is in its upward position.

17. An apparatus in accordance with claim 1 wherein said fuse chassis moving means includes a chain driven mechanism and means for connecting the chain driven mechanism to said fuse chassis, and including interlock means for preventing the withdrawal of said fuse chassis from its engaged position except through the activation of said chain driven mechanism and for preventing the insertion of the fuse chassis to its engaged position from its isolated position except through the activation of said chain driven mechanism.

18. A switching apparatus for use in an electrical control device comprising:
a housing having a switching section and a bus section, said bus section having at least one bus member for supplying incoming electrical current;
a fuse chassis attached to said housing for reciprocal movement into and out of the switching section of said housing;
means holding at least one fuse in said fuse chassis;
a contactor mechanism supported in the switching section of said housing for connecting and disconnecting flow of current from said bus member to an electrically actuated device, said contactor mechanism being movable between an activated and a deactivated position wherein current is capable of flowing from said bus member to the electrically activated device in said activated position but not in said deactivated position;
first connector means for connecting a first end of said fuse to said bus member;
second connector means for connecting a second end of said fuse to said contactor mechanism;
a door attached to a front face of said housing for pivotal motion between an open and a closed position; and
means for moving said fuse chassis between an engaged position and an isolated position, said first and second connector means connecting said fuse between said bus member and said contactor mechanism in said engaged position and said fuse being disconnected from both said bus member and said contactor mechanism in said isolated position, said fuse chassis moving means being actuated from outside said housing;
said fuse chassis moving means including a chain driven mechanism and means for connecting the chain driven mechanism to said fuse chassis, and including interlock means for preventing the withdrawal of said fuse chassis from its engaged position except through the activation of said chain driven mechanism and for preventing the insertion of the fuse chassis to its engaged position from its isolated position except through the activation of said chain driven mechanism.

19. An apparatus in accordance with claim 18 wherein said contactor mechanism includes a plurality of vacuum switching means for performing the connecting and disconnecting function and wherein said apparatus includes a plurality of said at least one bus member, a plurality of said bus contacts, one of said bus contacts being connected to each bus member, a plurality of said at least one fuse, a plurality of said first discrete fuse contacts, one of said first discrete fuse contacts engaging the first end of each fuse, a plurality of said second discrete fuse contacts, one of said second discrete fuse contacts engaging the second end of each fuse, and a plurality of said discrete contactor contacts, one of said discrete contactor contacts for connecting each one of said second fuse contacts to one of said vacuum switching means.

20. An apparatus in accordance with claim 16 or 18 or 19 wherein said chain driven mechaism includes a first sprocket, a second sprocket rotatably supported within said switching section and an endless chain drivingly coupled to said first and second sprocket for transferring the rotary motion of said first sprockets to said second sprocket, an actuation handle disposed outside said housing and drivingly coupled to said first sprocket, said second sprocket being drivingly coupled to said connecting means.

21. An apparatus in accordance with claim 20, wherein said connecting means includes a drive member fixedly secured to said second sprocket for rotation therewith about the axis of said second sprocket between two extreme positions and a driven member rotatable about an axis spaced from the axis of said second sprocket, said drive member including a coupling pin spaced from the axis of said second sprocket, said coupling pin being coupled to said driven member for transferring the rotary motion of said drive member to pivoting motion of said driven member about the axis of said driven member, said driven member including coupling means for connecting said driven member to said fuse chassis whereby the pivoting motion of said driven member is transferred as linear motion of said fuse chassis between its engaged and isolated positions.

22. An apparatus in accordance with claim 21 wherein said driven member includes a first plate having a slot for receiving the coupling pin of said drive member and a second plate spaced from said first plate along the axis of rotation of said driven member, said coupling means being comprised of an indentation formed in an edge of said second plate and a drive pin extending from said fuse chassis for driving reception within said indentation.

23. An apparatus in accordance with claim 22 wherein a mounting plate is supported within the switching section of said housing in a generally vertical disposition adjacent one of the side walls of said housing, a first axle extending from said mounting plate toward said fuse chassis, said second sprocket and said drive member being rotatably supported upon said first axle, a second axle extending from said mounting plate toward said fuse chassis, said second axle being spaced vertically from said first axle and extending generally parallel thereto, said first and second plates of said driven means being formed integral with and interconnected by a cylindrical section, said cylindrical section being rotatably carried by said second axle, and spring biasing means connected between said coupling pin and said cylindrical section for biasing said coupling pin downwardly within said slot whereby the rotary motion of said drive member is converted into curvilinear motion of said coupling pin within said slot to thereby pivot said first and second plates about the axis of said second axle.

24. An apparatus in accordance with claim 21 wherein said interlock means includes disposing said coupling pin at each of the two extreme positions of said drive member at a location with respect to the axis of rotation of said second sprocket such that attempted rotation of said driven member independent of said second sprocket causes a mechanical locking between the drive and driven members.

25. An apparatus in accordance with claim 17 including another interlock means comprised of an electrical interlock means for preventing the activation of said contactor mechanism unless said fuse chassis is in its engaged position, said electrical interlock means being activated by said means for connecting the chain driven mechanism to said fuse chassis.

26. An apparatus in accordance with claim 21 including another interlock means comprised of a microswitch having an actuating arm, said driven member contacting said actuator arm when the fuse chassis is in its engaged position, said microswitch being interposed between said contactor mechanism and a supply of low voltage control current to said contactor mechanism.

27. An apparatus in accordance with claim 20 including means for bypassing said microswitch by supplying a source of low voltage current independent of said microswitch, whereby said contactor mechanism can be activated when said fuse chassis is in its isolated position.

28. An apparatus in accordance with claim 1 including a latching means for locking said door in its closed position.

29. An apparatus in accordance with claim 28 wherein said latching means includes a rotatable handle disposed outside said door, an actuator bar disposed on the inside of said door and connected to said handle for rotary motion therewith, a pivotable latch plate, and a flange secured to the inside of said door adjacent said pivotable latch plate, said actuator bar in a locking position of said handle contacting said pivotable latch plate to thereby move said latch plate to a position wherein a portion of said latch plate is received within a slot of said flange to thereby lock said door in its closed position.

30. A switching apparatus for use in an electrical control device comprising:
a housing having a switching section and a bus section, said bus section having at least one bus member for supplying incoming electrical current;
a fuse chassis attached to said housing for reciprocal movement into and out of the switching section of said housing;
means holding at least one fuse in said fuse chassis;
a contactor mechanism supported in the switching section of said housing for connecting and disconnecting flow of current from said bus member to an electrically actuated device, said contactor mechanism being movable between an activated and a deactivated position wherein current is capable of flowing from said bus member to the electrically activated device in said activated position but not in said deactivated position;
first connector means for connecting a first end of said fuse to said bus member;
second connector means for connecting a second end of said fuse to said contactor mechanism;
a door attached to a front face of said housing for pivotal motion between an open and a closed position;
means for moving said fuse chassis between an engaged position and an isolated position, said first and second connector means connecting said fuse between said bus member and said contactor mechanism in said engaged position and said fuse being disconnected from both said bus member and said contactor mechanism in said isolated position, said fuse chassis moving means being actuated from outside said housing; and
a latching means for locking said door in its closed position, said latching means including a rotatable handle disposed outside said door, an actuator bar disposed on the inside of said door and connected to said handle for rotary motion therewith, a pivotable latch plate, and a flange secured to the inside of said door adjacent said pivotable latch plate, said actuator bar in a locking position of said handle contacting said pivotable latch plate to thereby move said latch plate to a position wherein a portion of said latch plate is received within a slot of said flange to thereby lock said door in its closed position.

31. An apparatus in accordance with claim 30 wherein said contactor mechanism includes a plurality of vacuum switching means for performing the connecting and disconnecting function and wherein said apparatus includes a plurality of said at least one bus member, a plurality of said bus contacts, one of said bus contacts being connected to each bus member, a plurality of said at least one fuse, a plurality of said first discrete fuse contacts, one of said first discrete fuse contacts engaging the first end of each fuse, a plurality of said second discrete fuse contacts, one of said second discrete fuse contacts engaging the second end of each fuse, and a plurality of said discrete contactor contacts, one of said discrete contactor contacts for connecting each one of said second fuse contacts to one of said vacuum switching means.

32. An apparatus in accordance with claim 29 or 30 or 31 including interlock means for preventing the opening of said door when said fuse chassis is in its engaged position.

33. An apparatus in accordance with claim 32 wherein said interlock means includes means for holding a portion of said latch plate within the slot of said flange mounted to the interior of said door when said fuse chassis is in its engaged position.

34. An apparatus in accordance with claim 33 wherein said holding means includes a cam plate extending from said fuse chassis, a follower rod engageable by said cam plate and a blocking bar attached to said follower rod for holding said latch plate in a door locking condition, said cam plate moving said follower rod and blocking bar to the position wherein said blocking bar holds said latch plate in the locking position.

35. An apparatus in accordance with claim 34 wherein said holding means includes an upper support flange and a lower support flange, said upper support flange having a horizontally extending top member and a horizontally extending lower member, said rod having a generally horizontally extending follower arm for engagement by said cam plate and a leg extending generally downwardly from an end of said follower arm, said upper and lower members of said upper flange and said lower flange each having a hole for receiving the leg of said follower rod, a biasing spring received about said follower rod and having a first end in contact with the lower horizontal member of said upper flange and a second end in contact with a pin extending from said follower rod at a location above said lower horizontal member, whereby said rod is biased upwardly and is driven downwardly against the bias of the spring by said cam plate when the fuse chassis is in its engaged position.

36. An apparatus in accordance with claim 1 or 2 including interlock means for preventing the movement of said fuse chassis from its isolated position to its engaged position when the door is open.

37. An apparatus in accordance with claim 29 or 30 or 31 including interlock means for preventing the movement of said fuse chassis from its isolated position to its engaged position when said door is open.

38. An apparatus in accordance with claim 37 wherein said interlock means includes a locking projection extending from said latch plate, said locking projection engaging a portion of said fuse chassis moving means when said door is in its open position whereby said moving means is prevented from moving said fuse chassis to its engaged position.

39. An apparatus in accordance with claim 38 including spring biasing means for biasing said latch plate to a door open position wherein said locking projection engages said fuse chassis moving means.

40. A switching apparatus for use in an electrical control device comprising:
   a housing divided into a switching section and a bus section, said bus section having a plurality of bus members for supplying incoming electrical current;
   a fuse chassis supported in said housing;
   means for supporting said fuse chassis in said housing for reciprocal movement into and out of the switching section of said housing;
   means holding a plurality of fuses in said fuse chassis;
   a contactor mechanism supported in the switching section of said housing for connecting and disconnecting flow of current from said bus members to an electrically actuated device, said connector mechanism including a plurality of vacuum switching means for performing the connecting and disconnecting function, said connector mechanism being movable between an activated and a deactivated position wherein current is capable of flowing from said bus members to the electrically actuated device in said activated position but not in said deactivated position;
   first connector means for connecting first ends of said fuses to said bus members;
   second connector means for connecting second ends of said fuses to said vacuum switching means;
   a door attached to a front face of said housing for pivotal motion between an open and a closed position;
   latching means for locking said door in said closed position;
   means for moving said fuse chassis between an engaged and an isolated position, said first and second connector means connecting said fuses between said bus members and said vacuum switches in said engaged positions and said fuses being disconnected from both said bus members and said vacuum switches in said isolated position, said fuse chassis moving means being actuatable from outside said housing;
   first interlock means comprising barrier means for blocking access to said bus members from the switching section when said fuse chassis is in the isolated position;
   second interlock means for preventing the withdrawal of said fuse chassis from its engaged position and for preventing the movement of said fuse chassis from its isolated position to its engaged position when said contactor mechanism is in its activated position;
   third interlock means for preventing the withdrawal of said fuse chassis from its engaged position except through the activation of said moving means;
   fourth interlock means comprised of an electrical interlock means for preventing the activation of said vacuum switches unless said fuse chassis is in its engaged position;
   fifth interlock means for preventing the opening of said door when said fuse chassis is in its engaged position; and
   sixth interlock means for preventing the movement of said fuse chassis from its isolated position to its engaged position when said door is open.

41. An apparatus in accordance with claim 40 wherein said moving means includes a drive member rotatably driven about a first axis, means for rotatably driving said drive member, a driven member rotatable about a second axis, said second axis being spaced from said first axis, a coupling pin fixed to said drive member at a location spaced from said first axis, said coupling pin being coupled to said driven member for transferring the rotary motion of said drive member to pivotal motion of said driven member about said second axis, and means for transferring the pivotal motion of said driven member to linear motion of said fuse chassis.

42. An apparatus in accordance with claim 41 wherein said third interlock means includes having said coupling pin pivotable between two extreme positions and disposing said coupling pin at said extreme positions relative to said first axis so that any attempted at rotation of said driven member except by rotating said drive member causes mechanical locking between said driven and drive members.

43. An apparatus in accordance with claim 42 wherein said driven member includes a first plate having a slot for receiving the coupling pin of said drive member and a second plate spaced from said first plate along the second axis, said coupling means being comprised of an indentation formed in an edge of said second plate for receiving said drive pin, said slot being generally rectangular shaped and having a lower most edge defining the extreme position to which said coupling pin can be pivoted, said lower most edge being so disposed that any attempted rotation of said driven member other than by rotating said drive member tends to force said coupling pin toward said lower motion edge to thereby cause said mechanical locking of said drive and driven members.

44. An apparatus in accordance with claim 41 or 42 wherein said fourth interlock means is comprised of a microswitch having an actuator arm, said driven member contacting said actuator arm when the fuse chassis is in its engaged position, said microswitch being interposed between said contactor mechanism and a supply of low voltage control current to said contactor mechanism such that said actuator arm must be contacted by said driven member for said low voltage current to be supplied to said contactor mechanism.

45. An apparatus in accordance with claim 40 or 42 wherein said barrier means of said first interlock means includes a stationary plate interposed between said switching section and said bus section, said stationary plate having apertures for permitting said first connector means to connect the first ends of said fuses to said bus members, a movable barrier plate having a solid portion for blocking the apertures of said stationary plate when said fuse chassis is in the isolated position, said movable barrier plate having apertures for alignment with the apertures of said stationary plate when said fuse chassis is in the engaged position, and means for moving said barrier plate between the position wherein the apertures of said stationary plate are blocked and a position wherein the apertures of said barrier plate are in alignment with the apertures of said stationary plate.

46. An apparatus in accordance with claim 45 wherein said barrier plate moving means includes a first link arm, a coupling plate, a rod and a drive arm, said first link arm having a first end pivotably coupled to a portion of said fuse chassis moving means and a second end pivotably coupled to said coupling plate, said rod being supported within said switching section, said coupling plate being carried by said rod for rotary motion about its axis, said drive arm having a first section pivotably coupled to said coupling plate and a second section pivotably coupled to said movable barrier plate, and means for attaching said movable barrier plate to said stationary plate for parallel motion relative to said stationary plate, whereby the pivoting of said coupling plate about the axis of said rod moves said barrier plate upwardly and downwardly.

47. An apparatus in accordance with claim 40 or 42 wherein said second interlock means includes a linkage means and a movable blocking means, said linkage means being coupled to a movable portion of said contactor mechanism and to said movable blocking means for transferring motion of said movable portion of the contactor mechanism to said blocking means, said movable blocking means obstructing the motion of said fuse chassis when said contactor mechanism is activated.

48. An apparatus in accordance with claim 47 wherein said blocking rod is supported adjacent a side of said fuse chassis, said blocking rod having a lower end biased into contact with a portion of said linkage means and an upper end movable to a blocking position wherein the upper end is in abutting relation to a flange extending the last-mentioned side of said fuse chassis.

49. An apparatus in accordance with claim 40 or 42 wherein said door latching means includes a rotatable handle disposed outside said door, an actuator disposed on the inside of said door and connected to said handle for rotary motion therewith, a pivotable latch plate, and a flange secured to the inside of said door adjacent said pivotable latch plate, said actuator bar in a locking position of said handle contacting said pivotable latch plate to thereby move said latch plate to a position wherein a portion of said latch plate is received within a slot of said flange to thereby lock said door in its closed position.

50. An apparatus in accordance with claim 49 wherein said fifth interlock means includes a cam plate extending from said fuse chassis, a follower rod engageable by said cam plate and a locking bar attached to said follower rod for holding said latch plate in a door locking condition, said follower rod being biased upwardly and said cam plate moving said follower rod and blocking bar downwardly against the said bias to the position wherein said blocking bar holds said latch plate in the locking position.

51. An apparatus in accordance with claim 49 wherein said sixth interlock means includes a locking projection extending from said latch plate, said locking projection engaging a portion of said fuse chassis moving means when said door is in its open position whereby said moving means is prevented from moving said fuse chassis to its engaged position.

52. An apparatus in accordance with claim 42 wherein said means for rotatably driving said drive member includes a chain driven mechanism having a first sprocket, a second sprocket and an endless chain drivingly received about said first and second sprockets, said first sprocket being actuatable by a handle from outside said housing and said second sprocket being rotatable about the axis of said drive member and being fixedly secured to said drive member for rotation therewith.

53. An apparatus in accordance with claim 52 wherein said sixth interlock means includes a locking projection extending from a portion of said latching means and a hole through a face of said first sprocket, said latching projection being received within the hole in said first sprocket when said door is in the open position to thereby prevent the rotation of said first sprocket.

54. A switching apparatus for use in an electrical control device comprising:
a housing having a switching section and a bus section, said bus section having at least one bus member for supplying incoming electrical current;
a fuse chassis attached to said housing for reciprocal movement into and out of the switching section of said housing;
means holding at least one fuse in said fuse chassis;
a contactor mechanism supported in the switching section of said housing for connecting and disconnecting flow of current from said bus member to an electrically actuated device, said contactor mechanism being movable between an activated and a deactivated position wherein current is capable of flowing from said bus member to the electrically activated device in said activated position but not in said deactivated position;
first connector means for connecting a first end of said fuse to said bus member;
second connector means for connecting a second end of said fuse to said contactor mechanism;
a door attached to a front face of said housing for pivotal motion between an open and a closed position;
means for moving said fuse chassis between an engaged position and an isolated position, said first and second connector means connecting said fuse between said bus member and said contactor mechanism in said engaged position and said fuse being disconnected from both said bus member and said contactor mechanism in said isolated position, said fuse chassis moving means being actuated from outside said housing;

interlock means for preventing the withdrawal of said fuse chassis from its engaged position and for preventing the movement of said fuse chassis from its isolated position to its engaged position when said contactor mechanism is in its activated position, said interlock means including linkage means and a movable blocking means, said linkage means being coupled to a movable portion of said contactor mechanism and to said movable blocking means for transferring motion of said movable portion of the contactor mechanism to said blocking means, and said movable blocking means obstructing the motion of said fuse chassis when said contactor mechanism is activated; and said linkage means including a connecting link, an arm and a blocking rod, said connecting link having a first end pivotably connected to the movable portion of said contactor mechanism and a second end, said arm having a stationary pivot point about which it pivots, said blocking rod having a first end in contact with said arm at a location spaced from said pivot point, the second end of said connecting link being connected to said arm intermediate its pivot point and the point of contact with said blocking rod whereby upward and downward motion of said connecting link moves said blocking rod upwardly and downwardly, a flange member extending from said fuse chassis and being disposed rearward of said blocking rod in the fuse chassis engaged position and forward of said blocking rod in fuse chassis isolated position whereby the motion of the fuse chassis beyond said blocking rod is prevented when said blocking rod is in its upward position.

55. An apparatus in accordance with claim 54 wherein said contactor mechanism includes a plurality of vacuum switching means for performing the connecting and disconnecting function and wherein said apparatus includes a plurality of said at least one bus member, a plurality of said bus contacts, one of said bus contacts being connected to each bus member, a plurality of said at least one fuse, a plurality of said first discrete fuse contacts, one of said first discrete fuse contacts engaging the first end of each fuse, a plurality of said second discrete fuse contacts, one of said second discrete fuse contacts engaging the second end of each fuse, and a plurality of said discrete contactor contacts, one of said discrete contactor contacts for connecting each one of said second fuse contacts to one of said vacuum switching means.

* * * * *